(12) United States Patent
Heath et al.

(10) Patent No.: US 7,531,030 B2
(45) Date of Patent: *May 12, 2009

(54) NATURAL GAS DEHYDRATOR AND SYSTEM

(76) Inventors: Rodney T. Heath, P.O. Box 701, Farmington, NM (US) 87499; Forrest D. Heath, 20683 Laurel Lock, Katy, TX (US) 77450

( * ) Notice: Subject to any disclaimer, the term of this patent is extended or adjusted under 35 U.S.C. 154(b) by 438 days.

This patent is subject to a terminal disclaimer.

(21) Appl. No.: 11/328,998

(22) Filed: Jan. 10, 2006

(65) Prior Publication Data

US 2007/0084341 A1    Apr. 19, 2007

Related U.S. Application Data

(63) Continuation-in-part of application No. 10/419,004, filed on Apr. 18, 2003, now Pat. No. 6,984,257, which is a continuation-in-part of application No. 10/071,721, filed on Feb. 8, 2002, now Pat. No. 6,551,379, which is a continuation of application No. 09/565,885, filed on May 5, 2000, now Pat. No. 6,364,933, which is a continuation-in-part of application No. 09/333,115, filed on Jun. 15, 1999, now Pat. No. 6,238,461.

(51) Int. Cl.
*B01D 53/14* (2006.01)
*B01D 53/26* (2006.01)

(52) U.S. Cl. .......................... 96/183; 96/236
(58) Field of Classification Search .................. 95/156, 95/186, 187, 231, 174–180, 192–194; 96/234, 96/236, 183–185, 201
See application file for complete search history.

(56) References Cited

U.S. PATENT DOCUMENTS

| | | | |
|---|---|---|---|
| 844,694 A | 2/1907 | Smith |
| 2,225,959 A | 12/1940 | Miller |
| 2,726,729 A | 12/1955 | Williams |
| 2,786,543 A | 3/1957 | Hayes et al. |
| 2,812,827 A | 11/1957 | Worley et al. |
| 2,853,149 A | 9/1958 | Gosselin |
| 2,984,360 A | 5/1961 | Smith |
| 3,094,574 A | 6/1963 | Glasgow et al. |
| 3,182,434 A | 5/1965 | Fryar |
| 3,254,473 A | 6/1966 | Fryar et al. |
| 3,255,573 A | 6/1966 | Cox, Jr. et al. |
| 3,288,448 A | 11/1966 | Patterson |
| 3,321,890 A | 5/1967 | Barnhart |
| 3,347,019 A | 10/1967 | Barnhart |

(Continued)

OTHER PUBLICATIONS

"Environmental Technology Verification Report", *Greenhouse Gas Technology Center Southern Research Institute*, no date given.

(Continued)

*Primary Examiner*—Frank M Lawrence
(74) *Attorney, Agent, or Firm*—Vidal A. Oaxaca; Justin R. Jackson; Peacock Myers, P.C.

(57) ABSTRACT

The present invention provides a natural gas dehydrator and method for recirculation of gaseous or combustible materials so that they are not released into the atmosphere and to provide fuel for the process. Likewise, liquid hydrocarbons are collected.

12 Claims, 10 Drawing Sheets

U.S. PATENT DOCUMENTS

| | | |
|---|---|---|
| 3,396,512 A | 8/1968 | McMinn et al. |
| 3,541,763 A | 11/1970 | Heath |
| 3,589,984 A | 6/1971 | Reid |
| 3,616,598 A | 11/1971 | Floral, Jr. |
| 3,648,434 A | 3/1972 | Graves, III et al. |
| 3,659,401 A | 5/1972 | Giammarco |
| 3,672,127 A | 6/1972 | Mayse et al. |
| 3,855,337 A | 12/1974 | Foral, Jr. et al. |
| 3,989,487 A | 11/1976 | Peterson |
| 4,010,009 A | 3/1977 | Moyer |
| 4,010,065 A | 3/1977 | Alleman |
| 4,108,618 A | 8/1978 | Schneider |
| 4,162,145 A | 7/1979 | Alleman |
| 4,332,643 A | 6/1982 | Reid |
| 4,342,572 A | 8/1982 | Heath |
| 4,396,371 A | 8/1983 | Lorenz et al. |
| 4,402,652 A | 9/1983 | Gerlach et al. |
| 4,431,433 A | 2/1984 | Gerlach et al. |
| 4,435,196 A | 3/1984 | Pielkenrood |
| 4,459,098 A | 7/1984 | Turek et al. |
| 4,474,549 A | 10/1984 | Capone |
| 4,511,374 A | 4/1985 | Heath |
| 4,539,023 A | 9/1985 | Boley |
| 4,583,998 A | 4/1986 | Reid et al. |
| 4,588,372 A | 5/1986 | Torborg |
| 4,588,424 A | 5/1986 | Heath et al. |
| 4,659,344 A | 4/1987 | Gerlach et al. |
| 4,674,446 A | 6/1987 | Padilla, Sr. |
| 4,676,806 A | 6/1987 | Dean et al. |
| 4,689,053 A | 8/1987 | Heath |
| 4,701,188 A | 10/1987 | Mims |
| 4,780,115 A | 10/1988 | Ranke |
| 4,919,777 A | 4/1990 | Bull |
| 4,978,291 A | 12/1990 | Nakai |
| 5,080,802 A | 1/1992 | Cairo, Jr. et al. |
| 5,084,074 A | 1/1992 | Beer et al. |
| 5,129,925 A | 7/1992 | Marsala et al. |
| 5,132,011 A | 7/1992 | Ferris |
| 5,163,981 A | 11/1992 | Choi |
| 5,167,675 A | 12/1992 | Rhodes |
| 5,209,762 A | 5/1993 | Lowell |
| 5,249,739 A | 10/1993 | Bartels et al. |
| 5,346,537 A | 9/1994 | Lowell |
| 5,453,114 A | 9/1995 | Ebeling |
| 5,490,873 A | 2/1996 | Behrens et al. |
| 5,536,303 A | 7/1996 | Ebeling |
| 5,664,144 A | 9/1997 | Yanai et al. |
| 5,665,144 A | 9/1997 | Hill et al. |
| 5,766,313 A | 6/1998 | Heath |
| 6,004,380 A | 12/1999 | Landreau et al. |
| 6,010,674 A | 1/2000 | Miles et al. |
| 6,095,793 A | 8/2000 | Greeb |
| 6,183,540 B1 | 2/2001 | Thonsgaard |
| 6,238,461 B1 | 5/2001 | Heath |
| 6,251,166 B1 | 6/2001 | Anderson |
| 6,332,408 B2 | 12/2001 | Howlett |
| 6,364,933 B1 | 4/2002 | Heath |
| 6,533,574 B1 | 3/2003 | Pechoux |
| 6,537,349 B2 | 3/2003 | Choi et al. |
| 6,537,458 B1 | 3/2003 | Polderman |
| 6,551,379 B2 | 4/2003 | Heath |
| 6,616,731 B1 | 9/2003 | Hillstrom |

OTHER PUBLICATIONS

"Natural Gas Dehydration", *The Environmental Technology Verification Program*, (Sep. 2003).

Archer, Phil , "TEG Regenerator Vapor Recovery in Amoco's Northwesern Business Unit", (Aug. 1992).

Reid, Laurance S., "Coldfinger An Exhauster for Removing Trace Quantities of Water from Glycol Solutions Used for Gas Dehydration", *Ball-Reid Engineers, Inc.*, Oklahoma City, Oklahoma, (1975),592-602.

NATURAL GAS DEHYDRATOR AND SYSTEM

CROSS-REFERENCE TO RELATED APPLICATIONS

This application is a continuation-in-part of, and claims the benefit of the filing of, U.S. patent application Ser. No. 10/419,004, now issued U.S. Pat. No. 6,984,257, entitled "Natural Gas Dehydrator and System", filed on Apr. 18, 2003, which is in turn a continuation-in-part application of U.S. patent application Ser. No. 10/071,721, now issued U.S. Pat. No. 6,551,379, entitled "Apparatus for Use with a Natural Gas Dehydrator", to Heath, filed on Feb. 8, 2002, which itself is a continuation application of U.S. patent application Ser. No. 09/565,885 filed May 5, 2000, now issued U.S. Pat. No. 6,364,933, which itself is a continuation-in-part application of U.S. patent application Ser. No. 09/333,115 filed Jun. 15, 1999 (U.S. Pat. No. 6,238,461) and the specifications and claims of those applications are incorporated herein by reference.

This application also is related to U.S. patent application Ser. No. 10/449,538, to Heath, filed on May 29, 2003, and the specifications and claims thereof are incorporated herein by reference. This application is also related to: U.S. Pat. No. 3,541,763, entitled "Gas Dehydrator", to Heath; U.S. Pat. No. 4,342,572, entitled "Thermal Circulation Gas Treater", to Heath; U.S. Pat. No. 4,511,374, entitled "Gas Temperature Control System for Natural Gas Separator", to Heath; U.S. Pat. No. 4,588,424, entitled "Fluid Pumping System", to Heath; U.S. Pat. No. 4,689,053, entitled "Heating System with Gas Jet Driven Circulation Flow for High Pressure Well Head Separator", to Heath; U.S. Pat. No. 5,766,313, entitled "Hydrocarbon Recovery System," to Heath; U.S. Pat. No. 6,238,461, entitled "Natural Gas Dehydrator," to Heath; and U.S. Pat. No. 6,364,933, entitled "Apparatus for Use with a Natural Gas Dehydrator," to Heath; and the specifications and claims thereof are incorporated herein by reference. This application is also related to U.S. Provisional Patent Application Ser. No. 60/377,259, entitled "Apparatus for Use with Natural Gas Dehydrator", filed on Apr. 30, 2002, and the specification thereof is incorporated herein by reference.

BACKGROUND OF THE INVENTION

1. Field of the Invention (Technical Field)

The present invention relates generally to an apparatus and system for use with natural gas dehydrators of the type used to remove water and water vapor from a natural gas stream having a mixture of natural gas, liquid hydrocarbons, liquid hydrocarbon vapors, water and water vapors.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

An example of natural gas dehydrators is disclosed in U.S. Pat. No. 6,238,461 issued May 29, 2001 and U.S. Pat. No. 6,364,933 issued Apr. 2, 2002 to Heath and the disclosures therein are specifically incorporated herein by reference. In general, such systems comprise a separator for receiving oil and water liquids from "wet" (water vapor laden) gas; and a water absorber, which employs a liquid dehydrating agent such as glycol, for removing the water vapor from the wet gas and producing "dry" gas suitable for commercial usage. The glycol is continuously supplied by a pump to the absorber in a "dry" low-water vapor-pressure condition and is removed from the absorber in a "wet" high-water vapor-pressure condition. The wet glycol is continuously removed from the absorber and circulated through a reboiler, which includes a still column for removing the absorbed water from the glycol and heating the glycol to provide a new supply of hot dry glycol. Heating of the glycol in the reboiler is generally accomplished through use of a gas burner mounted in a fire tube. The hot dry glycol from the reboiler passes through a heat exchanger, where the hot dry glycol transfers some of its heat to incoming wet glycol going to the still column. The dry glycol subsequently passes to a dry glycol storage tank. A glycol passage is provided to enable passage of wet glycol from the absorber to the reboiler and to pump dry glycol from a storage tank to the absorber. Besides water, the wet glycol going to the still column of the reboiler of the natural gas dehydrator will contain natural gas and absorbed hydrocarbons, and other gaseous components.

On many dehydrators, a volume of natural gas is intentionally induced into the reboiler in order to dry the wet glycol to a higher concentration than can be accomplished by simply adding heat. The process of intentionally inducing a volume of natural gas into the reboiler is referred to as gas stripping.

In the still column of the reboiler of the natural gas dehydrator, the water, natural gas, and other hydrocarbons are separated from the glycol by the pressure reduction from the absorber pressure to approximately atmospheric pressure in the still column and by the application of heat to the reboiler.

The water, natural gas, other hydrocarbons and gases contained in the wet glycol stream which are separated in the still column from the wet glycol are exhausted as vapors into the atmosphere through the atmospheric vent on the still column unless facilities are installed to collect and dispose of the vented vapors. The hydrocarbon vapors released through the still column of a natural gas dehydrator are air pollutants. Specifically, certain hydrocarbons such as benzene, toluene, ethylbenzene, and xylene, commonly referred to as BTEX have been proven to be carcinogenic. Other gases such as hydrogen sulfide, when present, are toxic.

The gas dehydrator and systems for use with gas dehydrators disclosed in U.S. Pat. Nos. 6,238,461, 5,766,313, 6,364,933, and Ser. No. 10/071,721, now issued U.S. Pat. No. 6,551,379, offer solutions to at least some of the problems discussed above. The present invention provides improvements to such gas dehydrators and systems.

BRIEF SUMMARY OF THE INVENTION

The present invention provides an apparatus and method for use with a natural gas dehydrator, and gas dehydrator systems. And embodiment of the present invention provides an apparatus for dehydrating natural gas, the apparatus comprising an absorber for receiving natural gas, at least one circulating apparatus linked to the absorber for circulating a wet desiccant and a dry desiccant, at least one emissions separator linked to the at least one circulating apparatus through which gaseous hydrocarbons exit, wherein gaseous hydrocarbons are not released to the atmosphere. In one embodiment, the wet desiccant comprises wet glycol and the dry desiccant comprises dry glycol.

In another embodiment, the apparatus also comprises a still column linked to the absorber, at least one liquid removal separator linked to the still column, and at least one vacuum system linked to the at least one separator.

In another embodiment, the apparatus comprises a heat source linked to the absorber, and a glycol-to-glycol heat exchanger linked to, and between, the heat source and the absorber. The apparatus may further comprise a glycol cooler linked to the at least one emissions separator, the apparatus may further comprise a water exhauster comprising a weir system, the water exhauster linked to a heat source.

In another embodiment, the apparatus comprises a blowcase linked to the water exhauster. The apparatus may further comprise a glycol storage linked to the absorber and a glycol reservoir linked to a glycol storage. The apparatus preferably a gas recovery system to receive gas from the blowcase, and the gas recovery system may comprise a heat source firing system. The hydrocarbons may be released from the blowcase and sent to the liquid separator. The hydrocarbons released from the blowcase may be sent to storage facilities. The gas hydrocarbons may be transferred to a gas recovery system.

Another embodiment provides a method of dehydrating natural gas, the method comprising providing an absorber for receiving natural gas, linking at least one emissions separator to the absorber, circulating wet desiccant and dry desiccant through the absorber, circulating wet desiccant through the at least one emissions separator, transferring gaseous hydrocarbons out of the at least one emissions separator, and preventing gaseous hydrocarbons from being released to the atmosphere. The wet desiccant and the dry desiccant preferably comprise wet glycol and dry gylycol, respectively. The method may comprise transferring the gaseous hydrocarbons from the emissions separator to a hydrocarbon recovery system or processing unit. The hydrocarbon recovery system or processing unit may comprise a heat source.

In another embodiment, the method also comprises linking a still column to the absorber, linking at least one liquid separator to the still column, and linking at least one vacuum system to the at least one separator. The method may also comprise linking a heat source to the absorber, and linking a glycol-to-glycol heat exchanger to, and between, the heat source and the absorber. The method preferably comprises linking a glycol cooler to the at least one emissions separator. The method may further comprise transferring wet glycol from the emissions separator to a heat exchanger and transferring a stream of wet glycol from the heat exchanger to a still column. The heat exchanger may comprise a glycol-to-glycol heat exchanger. Preferably, hydrocarbons are transferred from the emissions separator to a hydrocarbon recovery system or processing unit. The recovery system or processing unit may comprise a heat source. A stream of wet glycol may be transferred from the emissions separator to an eductor. The method may further comprise transferring wet glycol from the still column to a wet glycol cooler, and transferring the wet glycol from the wet glycol cooler to the emissions separator.

A primary object of the present invention is to provide an improved and efficient system for use with a gas dehydrator.

A primary advantage of the present invention is that it is easy to operate and does not release combustible gases into the atmosphere.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is an apparatus and system for use with a natural gas dehydrator. The gas dehydrator and systems disclosed in U.S. Pat. Nos. 5,766,313, 6,238,461, 6,364,933, and Ser. No. 10/071,721, now issued U.S. Pat. No. 6,551,379, are useful in understanding the present invention and the disclosures are specifically incorporated herein by reference.

The volume and pressure of the natural gas flowing through the system of the present invention can vary in wide ranges. Each unit is designed by those skilled in the art to perform at wide ranges of volume and pressure of the natural gas being processed and various controls have been associated with the natural gas dehydrators so that these dehydrators can be operated in a conventional manner by those skilled in the art. The operation of the various components of this invention uses conventional apparatuses that are normally used in the operation of a natural gas dehydrator. Therefore, the specific parameters associated with the operation of the various components of this invention are parameters known by those skilled in the art.

Figure 1:
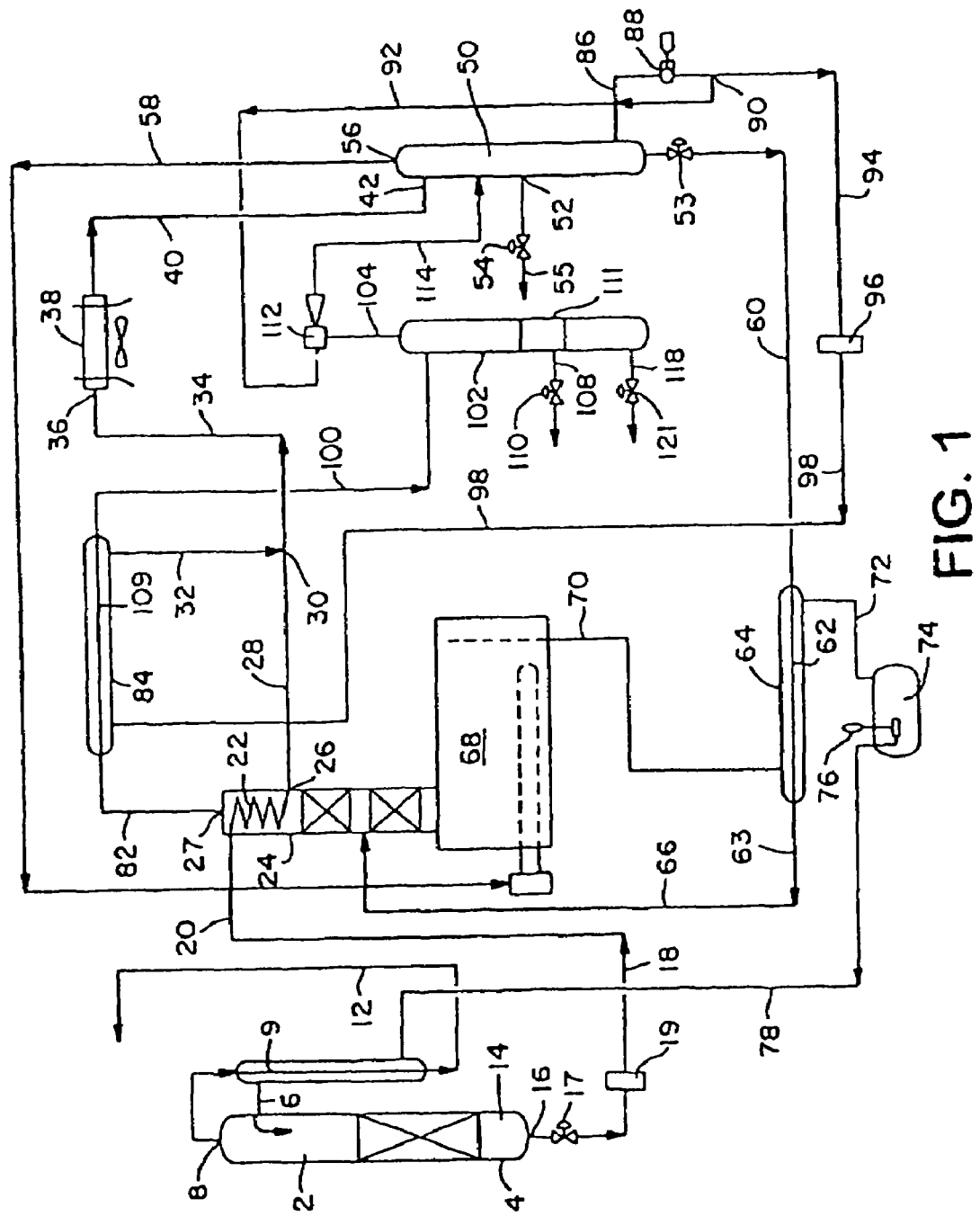
FIG. 1 is a flow diagram of one embodiment of the invention.

As shown in the drawings, in accordance with the present invention, the natural gas is first passed through conventional two or three-phase inlet separator 3 to remove water and liquid hydrocarbons therefrom. The natural gas is then fed into absorber 2, through inlet 4, so that the natural gas can flow upwardly through absorber 2. A dry desiccant such as, but not limited to, dry glycol (glycol is described herein as illustrative of desiccants in general) is introduced through inlet 6 and flows through spaced apart bubble trays or other contact medium (not shown) in absorber 2 and then downwardly through absorber 2. The dry glycol functions primarily to remove water from the natural gas and becomes wet glycol. The treated natural gas exits through outlet 8 in the top portion of absorber 2 and is passed through tube side 9 of glycol-gas heat exchanger 10 and passes out as dry, saleable natural gas through pipe 12 at relatively high pressures, for example 50 PSIG to 1500 PSIG depending on the operating pressures of the pipeline system. It is understood that any type of conventional heat exchanger can be used in place of exchanger 10 illustrated in FIG. 1.

In one configuration of the invention (see FIG. 1), the wet glycol is collected in wet glycol sump 14 in the bottom portion of absorber 2 and contains entrained and absorbed gases, liquid hydrocarbons, and water and exits absorber 2 at point 16, is discharged by control valve 17 through filter 19 in pipe 18 to inlet 20 of reflux coil 22 located in still column 24 (explained below). The flow of the wet glycol is controlled by a throttling liquid level control (not shown) located in absorber 2 and operates motor valve 17 to maintain a constant level of wet glycol in the bottom of absorber 2. The wet glycol flows through reflux coil 22, cooling and condensing some of the hot vapors in the top of still column 24. The wet glycol at inlet 20 is between approximately 90° and 120° F. and at exit 26 is approximately 150° F. The wet glycol exits reflux coil 22 at exit 26 and flows through pipe 28 where at point 30 it is combined with other wet glycol (explained below) flowing through pipe 32. A by-pass can be provided to by-pass reflux coil 22 when desired. The combined wet glycol flows through pipe 34 and enters inlet 36 of wet glycol cooler 38. Glycol cooler 38 may be one of many types of coolers. As shown in the drawings, the combined wet glycol flows through a radiator and is cooled by air pushed through the radiator by a fan. Preferably, the fan is driven at a constant speed and the amount of the cooling air passing through the radiator is controlled by a plurality of pivotally mounted shutters moved by suitable means, such as an air cylinder or other devices such as a servo motor which moves a rack to rotate each of the shutters between opened and closed positions such as that marketed by AIR-X-CHANGERS as MODEL 48H. In the system illustrated in FIG. 1, the combined wet glycol exits the wet glycol cooler at a temperature of between approximately 90° and 120° F.

The cooled combined wet glycol exits the glycol cooler 38 and flows through pipe 40 into inlet 42 of a three-phase emissions separator apparatus 50. Free gaseous hydrocarbons contained in the wet glycol are released in the three-phase emissions separator apparatus 50 as a result of the reduction of pressure from the pressure of the absorber of between approximately 50 and 1500 PSIG to the pressure in the three-phase emissions separator which is between approximately 10 and 30 PSIG and preferably about 15 PSIG. Liquid hydrocarbons are separated from the combined wet glycol in the three-phase emissions separator apparatus 50 by a weir system or interface liquid level controller (not shown) and are withdrawn through outlet 52 and flow through control valve 54 and pipe 55 to storage (not shown) or other apparatus. The amount of the wet glycol from the combined wet glycol entering the emissions separator 50, after the gases and liquid hydrocarbons have been removed, is then combined with a fixed volume of wet glycol contained in the emissions separator 50. The fixed volume of wet glycol is continuously recirculated. Therefore, the total volume of wet glycol in the emissions separator may be described as at least two portions of wet glycol. One portion is that required to be continuously circulated through one type of apparatus as explained below and another portion to be passed through glycol-to-glycol heat exchanger 64 for heat exchange with the hot dry glycol exiting the reboiler as explained below. From the glycol-to-glycol heat exchanger the heated wet glycol flows to the still column and into the reboiler. The volume of wet glycol exiting emissions separator 50 to enter the glycol-to-glycol heat exchanger 64 is about the same volume as the volume of glycol being pumped into absorber 2 by glycol pump 76 (see FIG. 1). The volume of dry glycol pumped is usually in the range of 3 to 6 gallons of dry glycol for each pound of water removed from the gas stream. The amount of dry glycol pumped is determined in a conventional manner known to those skilled in the art. The volume of wet glycol flowing out of emissions separator 50 to the glycol-to-glycol heat exchanger 64 is controlled by control valve 53 which is controlled by a throttling liquid level control (not shown) located in emission separator 50.

The freed gaseous hydrocarbons exit through outlet 56 in the top portion of the three-phase emissions separator apparatus 50 and flow through pipe 58 into a system, such as that described in the U.S. Pat. No. 5,766,313, to be used as fuel in a reboiler as described therein or may be delivered to any component of the apparatus or remote from the apparatus for combustion or storage of the hydrocarbons. A reboiler is described herein as illustrative of a heat source but does not limit the use of other heat sources.

Another portion of wet glycol passes from three-phase emissions separator 50 through pipe 60 and enters tube side 62 of glycol-to-glycol heat exchanger 64. It is understood that any type of heat exchanger may be used in place of the heat exchanger 64 shown in FIG. 1. Another portion of wet glycol in glycol-to-glycol heat exchanger 64 is heated by the hot dry glycol therein and flows from glycol-to-glycol heat exchanger 64 through pipe 66 and enters still column 24 of conventional reboiler 68, such as that illustrated in the '313 Patent. Another portion of wet glycol is changed into hot dry glycol which is then fed through pipe 70 into glycol-to-glycol heat exchanger 64 and is cooled by the other portion of wet glycol. The partially cooled dry glycol then passes through pipe 72 into dry glycol storage tank 74 from which it is pumped by pump 76 through pipe 78 into the gas to glycol heat exchanger 10 to be further cooled by the natural gas flowing through heat exchanger 10 and into pipe 12.

The one portion of the wet glycol in emissions separator 50 exits through pipe 86 and enters pump 88. The one portion of wet glycol exiting from pump 88 separates at point 90 into the first stream of wet glycol flowing through pipe 92 and a second stream of wet glycol flowing through pipe 94. The wet glycol in pipe 94 passes through filter 96 and then through pipe 98 into effluent condenser 84. As described above, the second stream of wet glycol exits effluent condenser 84 through pipe 32 and is combined at point 30 with the wet glycol in pipe 28.

Figure 2:
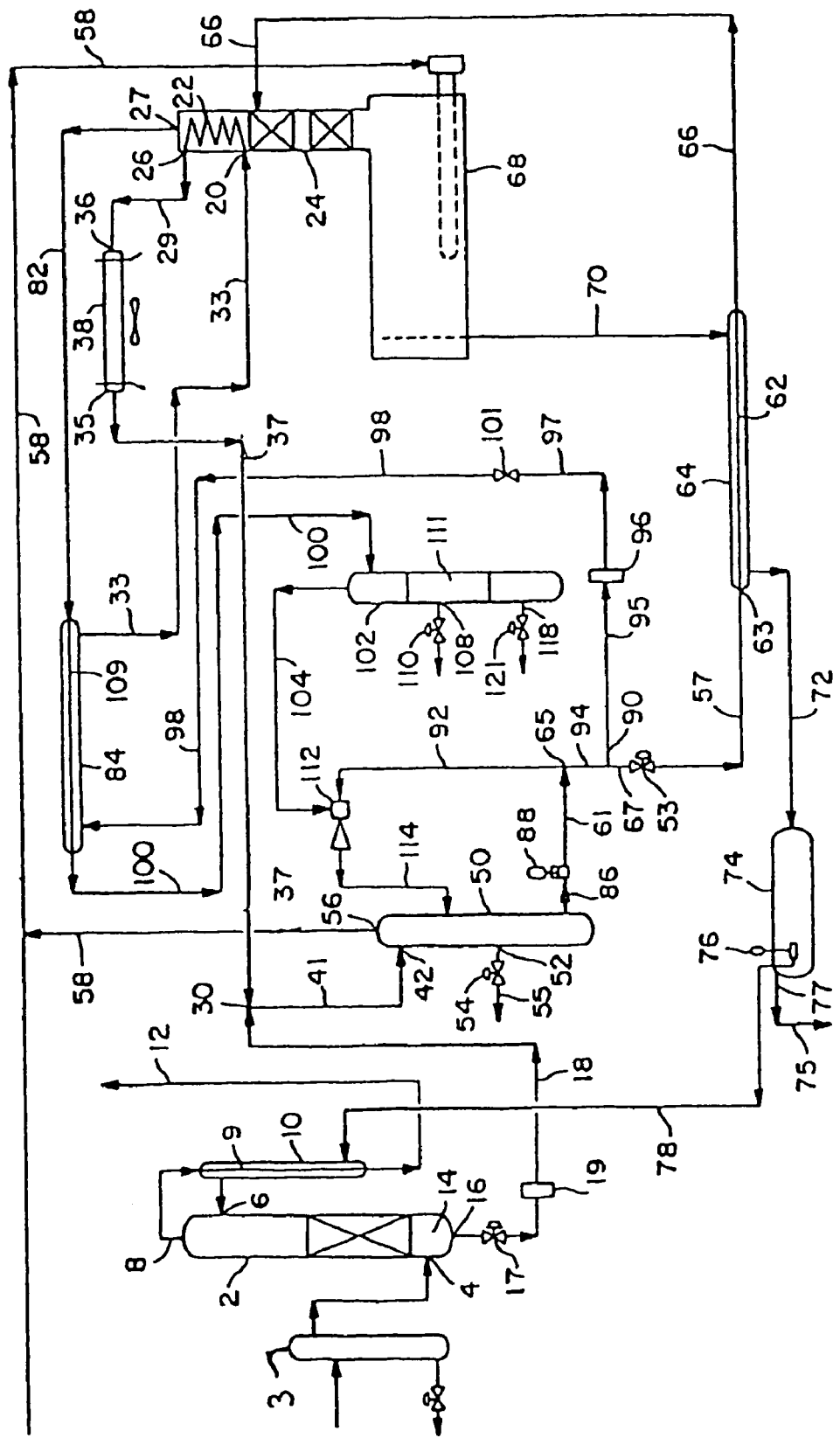
FIG. 2 is a flow diagram of another embodiment of this invention.

In a second configuration of the invention, as shown in FIG. 2, the wet glycol is collected in wet glycol sump 14 in the bottom portion of absorber 2 and contains entrained and absorbed gases, liquid hydrocarbons and water and exits absorber 2 at point 16. It is discharged by control valve 17 through filter 19 in pipe 18 to point 30 where the wet glycol from absorber 2 combines with cooled wet circulating glycol from glycol cooler 38 (explained below). The flow of the wet glycol from absorber 2 is controlled by a throttling liquid level control (not shown) located in absorber 2 and operates control valve 17 to maintain a constant level of wet glycol in the bottom of absorber 2. The combined wet glycol flows through pipe 41 into inlet 42 of three-phased emissions separator apparatus 50. Free gaseous hydrocarbons contained in the wet glycol from absorber 2 are released in three-phased emissions separator 50 as a result of the reduction of pressure from the pressure of the absorber of between 50 and 1500 PSIG to the pressure in three-phased emissions separator 50 which is between 10 and 30 PSIG and preferably about 15

PSIG. Liquid hydrocarbons are separated from the wet glycol in three-phased emissions separator 50 by gravity and by a weir system or an interfacing liquid level controller (not shown) and are withdrawn through outlet 52, control valve 54, and pipe 55 to storage (not shown) or other apparatus. The wet glycol entering emissions separator 50, after the gases and liquid hydrocarbons have been removed, is then combined with a fixed volume of wet glycol contained in emissions separator 50. The fixed volume of wet glycol is continuously recirculated. Therefore, the total volume of wet glycol in the emissions separator has at least two portions of wet glycol. One portion is that required to be continuously circulated (explained below) and another portion is to be passed through a glycol-to-glycol heat exchanger 64 for heat exchange with the hot dry glycol exiting reboiler 68 (explained below). From glycol-to-glycol heat exchanger 64 the heated wet glycol flows to still column 24 and into reboiler 68. The volume of wet glycol exiting emissions separator 50 through control valve 53 to enter the glycol-to-glycol heat exchanger 64 is about the same volume as the volume of glycol being pumped into absorber 2 by the glycol pump 76 (see FIG. 2). The volume of dry glycol pumped is usually in the range of 3 to 6 gallons of dry glycol for each pound of water removed from the gas stream. The amount of dry glycol pumped is determined in a conventional manner known to those skilled in the art. The volume of wet glycol flowing out of emissions separator 50 to the glycol-to-glycol heat exchanger 64 is controlled by control valve 53 which is controlled by an interfacing liquid level control (not shown) located in emissions separator 50. To overcome any potential pressure drop, in excess of the gas pressure in emissions separator 50, which might occur below control valve 53 as a result of friction drop in the glycol piping, glycol-to-glycol heat exchanger, or other apparatus, valve 53 is located to receive glycol from the discharge of circulating pump 88 at approximately 100 PSIG above the pressure in emissions separator 50 (explained below).

The freed gaseous hydrocarbons exit through outlet 56 in the top portion of the three-phase emissions separator apparatus 50 and flow through pipe 58 into a system, such as that described in the U.S. Pat. No. 5,766,313, to be used as fuel in a reboiler as described therein or may be delivered to any component of the apparatus or remote from the apparatus for combustion or storage of the hydrocarbons. A reboiler is described herein as illustrative of a heat source but does not limit the use of other heat sources.

The other portion of wet glycol passes from three-phased emissions separator 50 through pipe 86, circulating pump 88, and pipe 61 to point 65. At point 65, the other portion of wet glycol is split into two streams. As described below, one stream of wet glycol flows through pipe 92 to power eductor 112. The second stream of wet glycol flows through pipe 94 to point 90 where the second steam of wet glycol splits into a third wet glycol stream and a fourth wet glycol stream. The third wet glycol stream flows through pipe 67, control valve 53, and pipe 57 and enters tube side 62 of glycol-to-glycol heat exchanger 64. It is understood that any type of heat exchanger may be used in place of heat exchanger 64 (Shown in FIG. 2). The third wet glycol stream in glycol-to-glycol heat exchanger 64 is heated by the hot dry glycol therein and flows from glycol-to-glycol exchanger 64 through pipe 66 and enters still column 24 of conventional reboiler 68 such as that illustrated in the '313 Patent wherein the other portion of wet glycol is changed into hot dry glycol which is then fed through pipe 70 into the shell side of glycol-to-glycol heat exchanger 64 and is cooled by the other portion of wet glycol. The partially cooled dry glycol then passes through pipe 72 into a dry glycol storage tank 74 from which it is pumped by pump 76 through pipe 78 into the gas to glycol heat exchanger 10 to be further cooled by the natural gas flowing through heat exchanger 10 and into pipe 12. Dry glycol storage 74 has vent pipe 75 which vents dry glycol storage 74 to the atmosphere. Pipe 75 is connected to dry glycol storage 74 at point 77.

Wet glycol stream 4 flows at approximately 100 PSIG pressure created by circulating pump 88, through pipe 95, filter 96, pipe 97, fixed choke 101 and pipe 98 to enter the shell side of overhead condenser 84. Fixed or variable choke 101 or a control valve actuated by a pressure control device can control the volume of wet glycol flowing through pipe 98. The temperature of the wet glycol entering the shell side of overhead condenser 84 is substantially the same as the temperature of the wet glycol contained in emissions separator 50. The temperature of the wet glycol in emissions separator 50 is maintained by a thermostat, located in emissions separator 50, which opens and closes shutters on glycol cooler 38 (explained below), and the temperature of the glycol in emissions separator 50 is normally maintained at approximately 90 to 120 degrees Fahrenheit. Wet glycol stream 4 flows through the shell side of overhead condenser 84 where wet glycol stream 4 is in a heat exchange relationship with the hot effluent from still column 24 (explained below). Wet glycol stream 4 passes from overhead condenser 84 through pipe 33 to the inlet 20 of a reflux coil located in still column 24 (explained below). Wet glycol stream 4 flows through reflux coil 22 cooling and condensing some of the hot vapors in the top of still column 24. Wet glycol stream 4 exits reflux coil 22 at exit 26 and flows through pipe 29 to inlet 36 of wet glycol cooler 38. If desired, a bypass line can be provided to bypass reflux coil 22. Glycol cooler 38 may be one of many types of coolers useful in accordance with the present invention. The drawings show the wet glycol flowing through a radiator and cooled by air pushed through the radiator by a fan. Preferably, the fan is driven at a constant speed and the amount of the cooling air passing through the radiator is controlled by a plurality of pivotally mounted shutters moved by a suitable means, such as an air cylinder or other devices such as a servo motor which moves a rack to rotate each of the shutters between opened and closed positions such as that marketed by AIR-X-CHANGERS as model 48H. In the system illustrated in FIG. 2, cooled wet glycol stream 4 exits glycol cooler 38 at point 35 at a temperature of between approximately 90 and 120 degrees Fahrenheit. From point 35 cooled wet glycol stream 4 flows through pipe 37 to point 30 where it combines with the wet process glycol from absorber 2 and the combined wet glycol flows through pipe 40 to inlet 42 of emissions separator 50.

During the standard glycol dehydration process, gases and liquid hydrocarbons generated by the process are routinely released to the atmosphere. The gases and liquid hydrocarbons released to the atmosphere are the result of gas being entrained or absorbed in the dry glycol while it is contacting the natural gas in the absorber. Additional gas is entrained in the wet glycol when a pressure actuated pump is used to pump the dry glycol into the absorber. The entrained and absorbed gases and hydrocarbons are released from the wet glycol at two points in the process. First, most of the entrained gases are released from the wet glycol in the emissions separator by a reduction of pressure. Second, the balance of gases, liquid hydrocarbons, and water are substantially released from the wet glycol by the application of heat in the reboiler as well as by stripping in the still column.

One of the goals of the process of this invention is to eliminate the atmospheric pollution and the wasting of hydrocarbon energy that now occurs in most glycol dehydration of natural gas. To accomplish this goal, the process collects all the combustible gaseous vapors and liquid hydrocarbons generated by the glycol dehydration process. The collected combustible vapors are sent to a heat source such as, but not limited to, the burner fuel system to be used as fuel gas in heating the reboiler although the heat source can be located anywhere and be separate from the natural gas dehydration system. The collected liquid hydrocarbons are routed to a liquid storage and handling system.

As stated above, the other portion of wet glycol entering reboiler 68 is subjected to the heat in the reboiler and an effluent is formed in still column 24. This effluent may comprise liquid water, liquid hydrocarbons, vaporized water, gases and vaporized hydrocarbons. These effluents may be treated in systems similar to those described in the '461 and '933 Patents or by a system illustrated in FIG. 1, wherein the effluent in still column 24 exits into pipe 82 and passes through the tube side of effluent condenser 84 where it is cooled as described below. Effluent condenser 84 may be of the type illustrated in the '461 and '933 Patents. If desired, an effluent condenser such as that illustrated in FIGS. 6 and 7 of the '933 Patent may be modified so that the fans illustrated in the '933 Patent and labeled "234" and "252" therein may be continuously operated and not intermittently by a thermostat as described therein. Instead, the control of the temperature in the effluent condenser may be controlled by pivotally mounted shutters located in either the exit portion or the entrance portion of the effluent condenser. These pivotally mounted shutters may be operated between opened and closed positions by a servo motor, air cylinder, or other similar device controlled by a thermostat. As shown in FIG. 2, the effluent passes through tube side 109 of effluent condenser 84 where it is cooled to approximately 90 to 120 degrees Fahrenheit by wet glycol entering the shell side of effluent condenser 84 via pipe 98. The cooled effluent includes both gaseous and liquid components which are routed to separator 102 via pipe 100. The cooled effluent exiting effluent condenser 84 flows through pipe 100 and enters separator 102 which is similar to the separator shown in FIGS. 8 and 9 of the '933 Patent except that it is mounted in a vertical position instead of the horizontal position.

In separator 102, the gaseous hydrocarbons are withdrawn from the upper portion of separator 102 through pipe 104; the liquid hydrocarbons collected in separator 102 are withdrawn through pipe 108 and control valve 110 to the hydrocarbon storage facilities, the water is withdrawn through pipe 118 and control valve 121 to disposal. The first stream of wet glycol passing through eductor 112 creates a vacuum to draw the gaseous hydrocarbons through pipe 104 and entrains the gaseous hydrocarbons in the first stream of wet glycol. The first stream of wet glycol passing through eductor 112 compresses the gaseous hydrocarbons entrained therein to the pressure maintained in emissions separator 50 and then flows through pipe 114 into emissions separator 50 wherein the gaseous hydrocarbons separate from the first stream of wet glycol and flow with the freed gaseous hydrocarbons through pipe 58 to the fuel system. Although other types of devices may be used to create the vacuum and compress the gases, an eductor is the preferred device to be used in the present invention.

Figure 3:
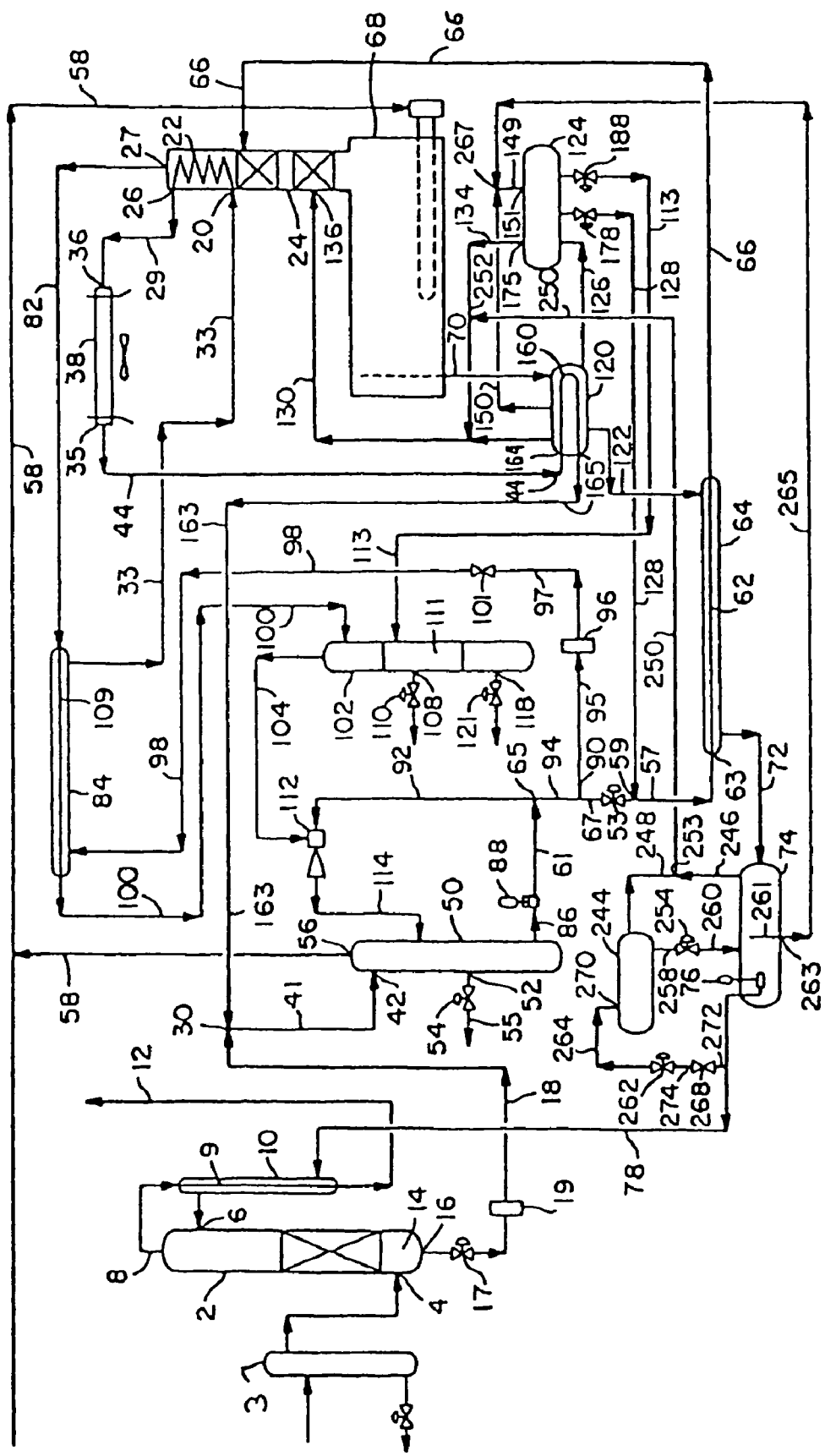
FIG. 3 is a flow diagram of another embodiment of this invention.
Figure 4:
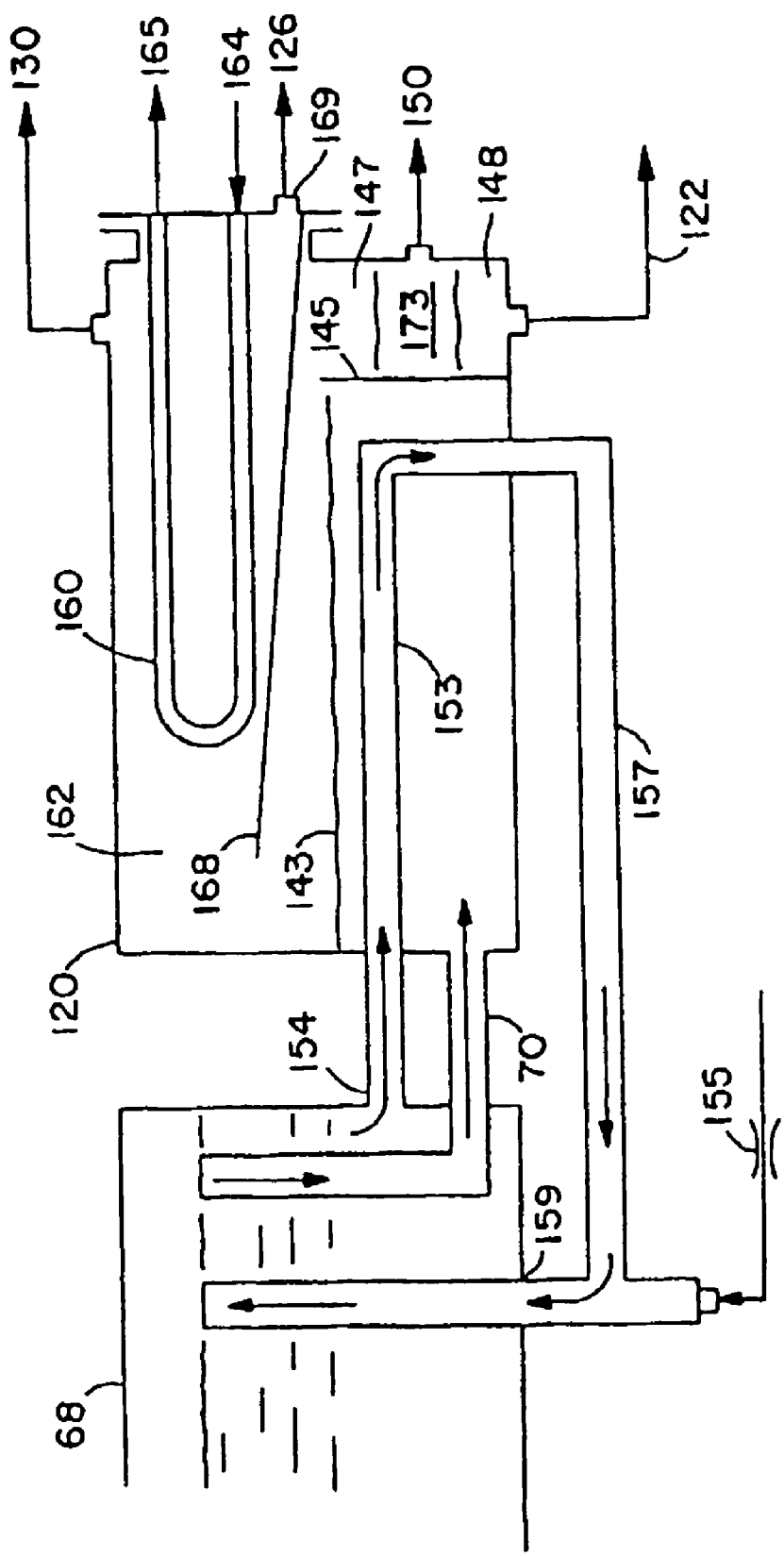
FIG. 4 is a sketch of a water exhauster of this invention.
Figure 5:
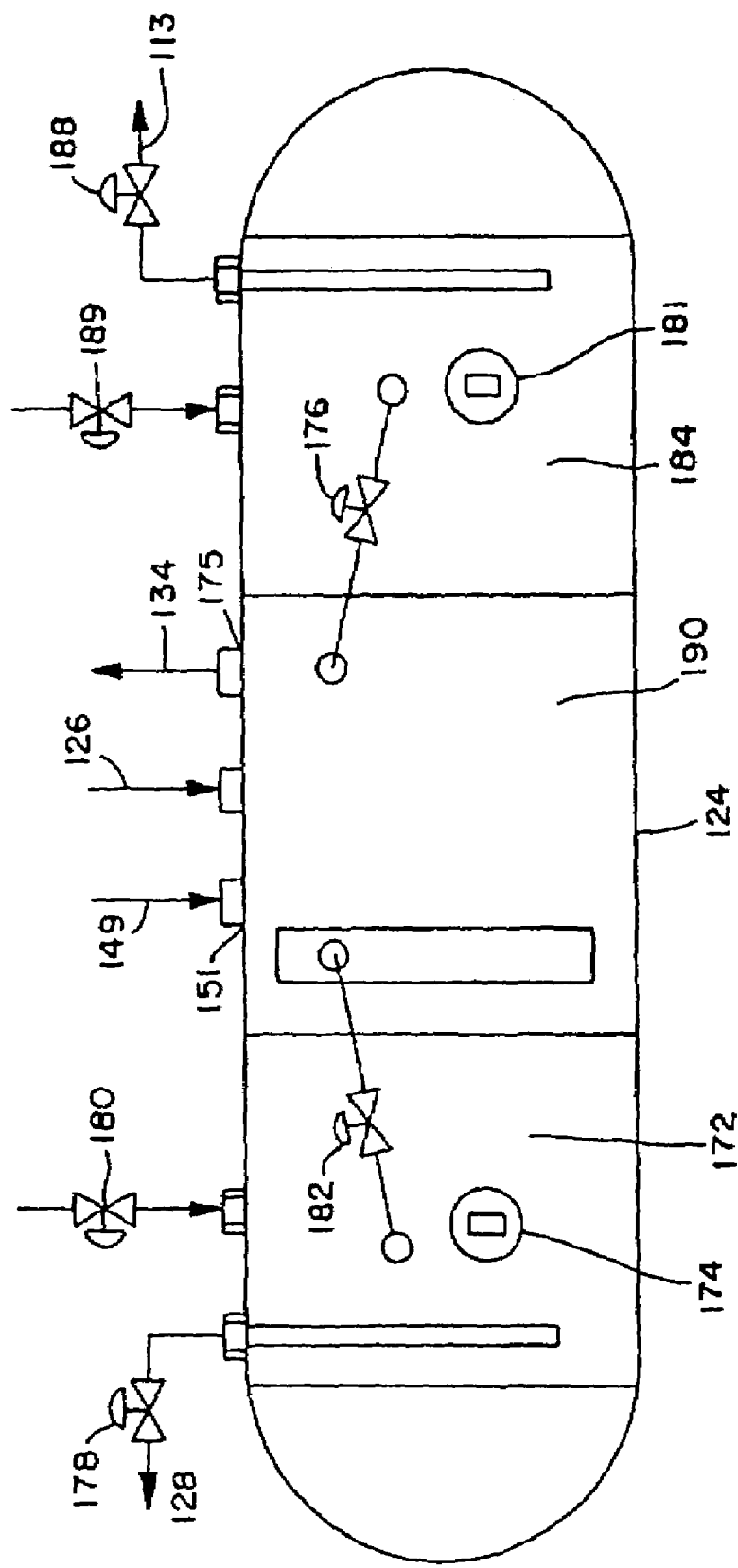
FIG. 5 is a sketch of a blowcase of this invention.

FIGS. 3 to 5 illustrate another embodiment of the present invention. These Figures incorporate a large part of FIG. 2 wherein the same reference numerals have been applied to corresponding parts of FIG. 2. In FIGS. 3 to 5, there is illustrated an embodiment of the invention wherein additional water is removed from the dry glycol in pipe 70 to make super dry glycol.

As illustrated in FIG. 3, the dry glycol in pipe 70 enters water exhauster 120 (explained below), wherein additional water is removed from the dry glycol to make super dry glycol which exits water exhauster 120 and flows through pipe 122 into the shell side of glycol-to-glycol heat exchanger 64 and then through pipe 72 into what is now super dry glycol storage 74. From storage 74, the super dry glycol is pumped to absorber 2 and then completes the above described closed loop system by returning to reboiler 68 via emissions separator 50, pipe 86, circulating pump 88, pipe 61, pipe 94, pipe 67, control valve 53, pipe 57, glycol-to-glycol heat exchanger 64, and pipe 66 to still column 24.

The cooled, wet glycol exits glycol cooler 38 at point 35 and flows through pipe 44 to inlet 164 of a condenser tube bundle 160 mounted in water exhauster 120, as described below, to condense some of the vapors in the vapor section of water exhauster 120. The condensate (mainly water and some hydrocarbons) is transmitted to blowcase 124 through pipe 126. Blowcase 124 has a weir system that separates the condensate into its water and hydrocarbon components. Water from blowcase 124 is discharged by control valve 178 into pipe 128 to combine at point 59 with the wet glycol flowing in pipe 57. Control valve 178 is controlled by a liquid level control (not shown) mounted in water chamber 172 of blowcase 124. Hydrocarbons from blowcase 124 (see FIG. 5) are preferably discharged by control valve 188 through pipe 113 into hydrocarbon chamber 111 of vacuum separator 102. In some applications, the hydrocarbons are dumped directly to the hydrocarbon storage. Control valve 188 is controlled by a liquid level control (not shown) mounted in hydrocarbon chamber 184 of blowcase 124.

Except during the dumping cycle of blowcase 124, the pressure in blowcase 124, water exhauster 120 and reboiler 68 is the same. The equal pressure in blowcase 124, water exhauster 120 and reboiler 68 is established and maintained by connecting equalizing pipes 130 and 134 to inlet 136 of still column 24.

Water exhauster 120, blowcase 124 and the flow of fluids is preferably as illustrated in FIGS. 4 and 5; however, other systems, such as those described in U.S. Pat. Nos. 3,589,984 and 4,332,643 and in the article Coldfinger by L. S. Reid may also be used in accordance with the present invention. As illustrated in FIG. 4, dry glycol at about 390° F. having a glycol concentration of approximately 98.6 percent weight concentration exits reboiler 68 through pipe 70 to water exhauster 120. Dry glycol 143 in water exhauster 120 is retained for about thirty (30) minutes and is changed, as described below, into super dry glycol that flows over dam 145 into weir system 147 which separates any entrained oil and the super dry glycol. Super dry glycol 148, having a glycol concentration of about 99.8 percent weight concentration, exits water exhauster 120 into pipe 122 and flows through the shell side of the glycol-to-glycol heat exchange 64 and thereafter flows as described above. Free oil 173 exits weir system 147 of water exhauster 120 through pipe 150 and pipe 149 and enters through inlet 151, the weir section 190 of blowcase 124 (explained below).

In one embodiment of the present invention, a heat source such as, but not limited to, a thermosiphon or thermojet coil in the liquid section of water exhauster 120 helps to maintain a hotter environment conducive to vaporization from the liquids to the vapor space and to an increase in the circulation of liquids (via thermal gradient) to promote vaporization. Many dehydrator applications require high glycol concentration to attain the required water dew point in the natural gas stream and the typical approach to increase the concentration is by gas stripping. However, gas stripping to strip water from the glycol during the concentration step of the process increases gas that is vented from the still column and thus makes an emissions free dehydrator difficult to implement. Using a water exhauster eliminates the need to gas strip thus helping implement an emissions-free dehydrator. Thus, the use of water exhauster 120 allows obviating the need for gas stripping.

Dry glycol 143 in water exhauster 120 is maintained at approximately 390° F. by thermo jet coil 153 which is connected to reboiler 68 at point 154. Thermo jet coil 153 continuously circulates hot dry glycol out of reboiler 68. The thermo jet utilizes a small volume of the recovered gas from emissions separator 50 flowing through a small orifice 155 to create a flow of hot dry glycol through coil 153. The hot dry glycol flows through thermo-jet coil 153 and returns to reboiler 68 through pipe 157 and enters reboiler 68 at point 159.

The cooled, wet glycol flows from outlet 35 of glycol cooler 38 through pipe 44 to inlet 164 of water exhauster 120. The cooled, wet glycol, at a temperature of between approximately 90 to 120 degrees Fahrenheit, enters condenser tube bundle 160 at point 164 and exits at point 165. From point 165, the cooled wet glycol flows through pipe 163 to point 30 where it combines with the process glycol from absorber 2, and, as previously described, from point 30, the cooled wet glycol flows through pipe 41 to inlet 42 of emissions separator 50. The relatively cool wet glycol flowing through condenser tube bundle 160 cools the vapors in vapor section 162. Cooling of the vapors in vapor section 162 results in the condensation of some of the vapors in vapor section 162 changing the partial pressure equilibrium of the various vapor components in vapor section 162. The vapors in vapor section 162 generally include four components comprising water, glycol and condensable and non-condensable hydrocarbons. Since water has a relatively low boiling temperature compared to glycol, it has a greater vapor pressure than glycol and is the largest component of the vapors in vapor section 162. Liquids condensed from vapor section 162 are collected on collection tray 168 and removed from water exhauster 120 at point 169. Condensation of the vapors and the removal of the condensed liquids from water exhauster 120 continually changes the partial pressure equilibrium of the vapors in vapor section 162 and causes the liquid components (glycol, water and hydrocarbons) in dry glycol 143 in water exhauster 120 to react to re-establish their percentage of the equilibrium vapor pressure in vapor section 162. Being the largest component of the vapors in vapor section 162, water is the largest component condensed and is the primary component evolved from hot dry glycol 143 while re-establishing the partial pressure equilibrium of the vapors in vapor section 162. Therefore, the body of hot dry glycol 143 in water exhauster 120 becomes increasingly water dry so that super dry glycol flows from weir system 147 into pipe 122.

The condensed liquids collected on collection tray 168 of water exhauster 120, removed via point 169 and line 126, are routed to three-phasing weir chamber 190 of blowcase 124. Three-phasing chamber 190 separates the condensates from water exhauster 120 into water and hydrocarbon components and, through a weir system, routes the water through valve 182 into water chamber 172 and the hydrocarbons through valve 176 into hydrocarbon chamber 184 of blowcase 124. Vent pipe 130, vent pipe 134, and vent pipe 250 equalize the pressure in water exhauster 120, blowcase 124, dry glycol storage 74, and glycol reservoir vessel 244 with the pressure in reboiler 68 by connecting into still column 24 at point 136.

Referring to FIG. 5, when the water level in chamber 172 of blowcase 124 reaches a level to actuate liquid level controller 174, a pressure signal is sent to close normally opened valve 182 and to open normally closed valves 178 and 180. Closing valve 182 temporarily stops the transfer of water from three-phasing chamber 190 into water chamber 172. Opening valve 180 allows recovered gas from emissions separator 50 to enter water chamber 172 to provide the pressure energy to partially evacuate water chamber 172 through water dump valve 178 and line 128. The evacuated water is mixed and entrained into the wet glycol in line 57 before the wet glycol enters tube side 62 of glycol-to-glycol heat exchanger 64. When the water level lowers to a preset level, liquid level controller 174 vents pressure signal and valves 182, 178, and 180 return to their normal positions. The gas in water chamber 172 flows through normally opened valve 182 into three-phasing chamber 190. Once the pressure in water chamber 172 and three-phasing chamber 190 equalizes, water again begins to flow from three-phasing chamber 190 into water chamber 172. The power gas, which was released into three-phasing chamber 190, passes from outlet 175 through equalizing pipes 134, and 130 into an inlet 136 of still column 24.

The operation of hydrocarbon chamber 184 mirrors the operation of water chamber 172. Liquid level controller 181 operates the same as liquid level controller 174. Normally opened valve 176 operates the same as normally opened valve 182. Normally closed valves 188 and 189 operate the same as normally closed valves 178 and 180. The hydrocarbons dumped through valve 188 are preferably transferred through pipe 113 to hydrocarbon chamber 111 of vacuum separator 102. In some applications, the hydrocarbons dumped from hydrocarbon chamber will be transferred directly to the oil storage facilities.

Figure 6:
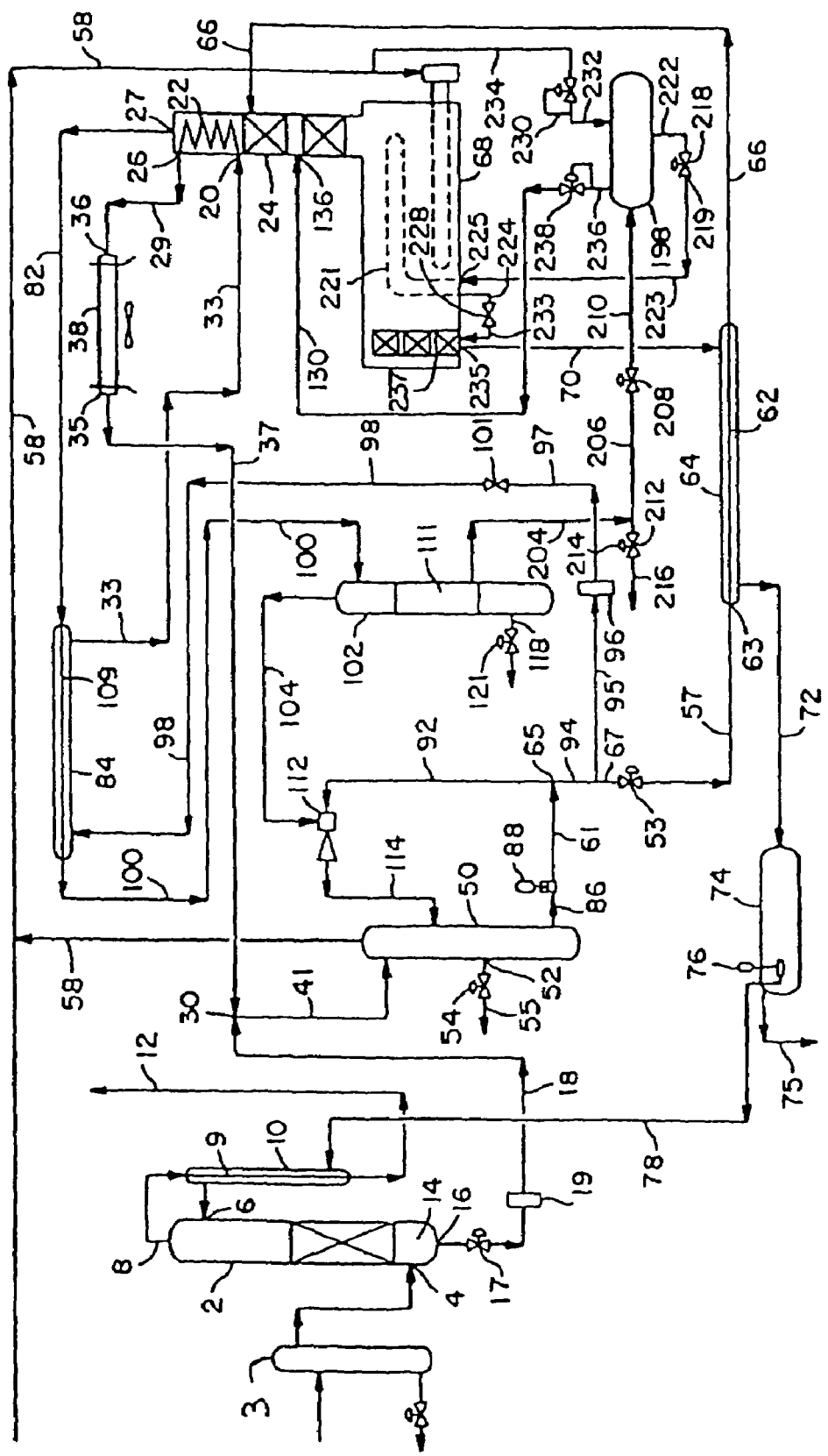
FIG. 6 is a flow diagram of another embodiment of this invention.
Figure 9:
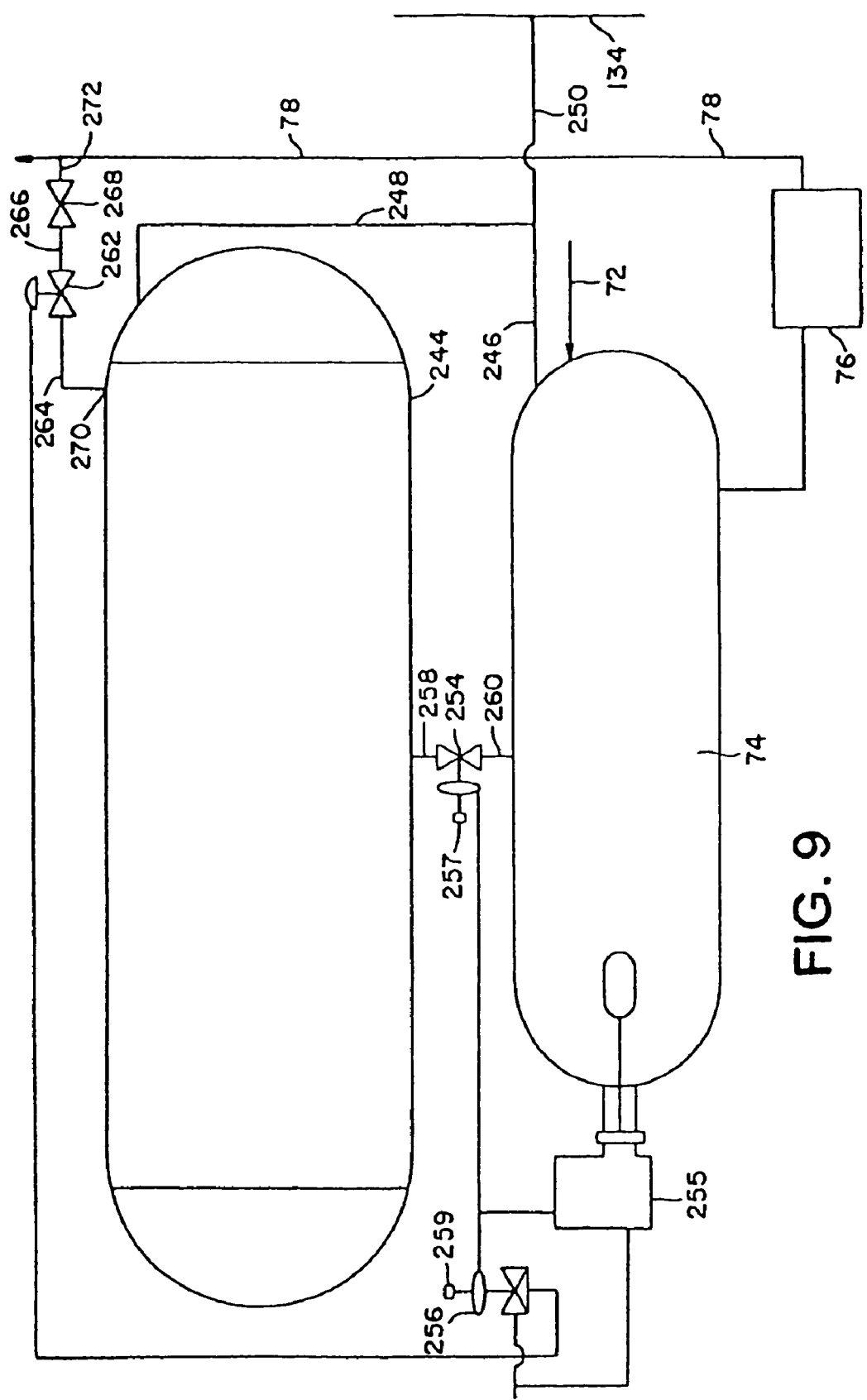
FIG. 9 is a sketch of a glycol storage and glycol reservoir of this invention.

FIG. 6 discloses another embodiment of the invention. FIG. 6 incorporates a large part of FIG. 2 wherein the same reference numerals have been applied to corresponding parts of FIG. 2. In FIG. 6, there is illustrated another embodiment of the invention wherein additional water is removed from the hot, dry glycol as the hot, dry glycol is exiting reboiler 68 through packed stripping column 237 mounted in reboiler 68. As illustrated in FIG. 6, hot, dry glycol at approximately 98.6 percent weight concentration exits reboiler 68 and flows downwardly through packed stripping column 237. While flowing downwardly through packed stripping column 237, the hot, dry glycol comes into intimate contact with heated and vaporized, liquid hydrocarbon gases that are flowing up, counter flow to the hot dry glycol. While flowing in intimate contact with the hot dry glycol, the heated, liquid hydrocarbon gases "gas strip" additional water from the hot dry glycol, and the hot dry glycol exits, at approximately 99.8 weight concentration, from stripping column 237. The super dry glycol enters pipe 70 and flows through glycol-to-glycol heat exchanger 64 and pipe 72 into super dry glycol storage 74. Super dry glycol storage 74 may be vented to the atmosphere or operating under a vacuum as shown in FIG. 9. From glycol storage 74, the super dry glycol is pumped to absorber 2 and completes the above described closed loop system by returning to reboiler 68 via emissions separator 50, circulating pump 88, pipe 61, pipe 94, pipe 67, control valve 53, pipe 57, glycol-to-glycol heat exchanger 64, and pipe 66 to still column 24.

The heated, liquid hydrocarbon gases, required to strip additional water from the hot dry glycol exiting reboiler 68 through packed stripping column 237, flow through pipe 233 to the gas inlet of stripping column 237. The heated, liquid hydrocarbon gases enter stripping column 237 and flow upwardly through the hot dry glycol and exit from the top of stripping column 237 into reboiler 68. From reboiler 68 the heated, liquid hydrocarbon gases flow into still column 24 to mix with the other gases and water vapor contained in still column 24. The total of gases contained in still column 24 are effluents. The effluents rise to the top and exit still column 24 at point 27. As previously described, the effluents flow, under a vacuum, through pipe 82, overhead condenser 84 and pipe 100 into vacuum separator 102.

Overhead condenser 84 cools the effluent and most of the water. Hot, vaporized, liquid hydrocarbons, contained in the effluent, are changed from a vapor to a liquid phase. The effluent enters vacuum separator 102 and, through the weir system of vacuum separator 102, are transferred to hydrocarbon chamber 111 of vacuum separator 102. Most of the liquid hydrocarbons transferred to hydrocarbon chamber 111 are again used in a closed loop system (described below), to strip additional water out of the hot glycol flowing out of reboiler 68 through stripping column 237.

Figure 7:
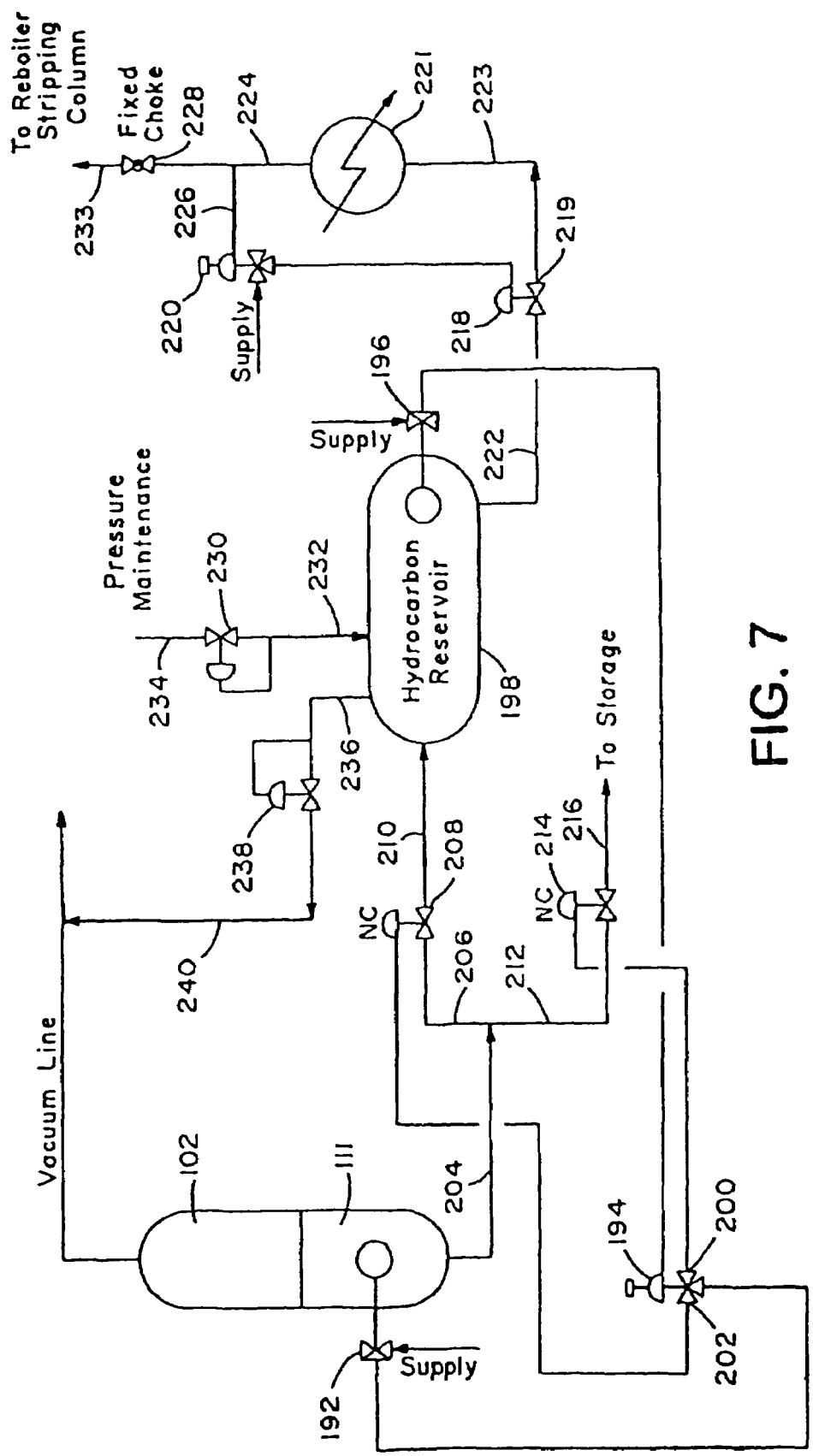
FIG. 7 is a sketch of a hydrocarbon gas stripping system of this invention.

The heated, liquid hydrocarbon gases used in stripping column 237 to remove additional water from hot glycol exiting reboiler 68, are obtained by heating a portion of the hydrocarbon liquids which have been recovered as previously described, in hydrocarbon chamber 111 of vacuum separator 102. Referring to FIG. 7, when the level of hydrocarbons in hydrocarbon chamber 111 reach the high level set point of snap acting liquid control 192, liquid level control 192 sends a pressure signal to the common port of three-way pressure switch 194 such as supplied by Wellmark, Inc. Three-way pressure switch 194 is actuated by an adjustable spring working against a pressure-loaded diaphragm. The pressure to load the diaphragm of pressure switch 194 is supplied by throttling liquid level control 196 mounted in hydrocarbon reservoir vessel 198. The throttling liquid level control 196 maintains a relatively fixed level of hydrocarbons in reservoir vessel 198 by increasing or decreasing the pressure signal being sent to three-way pressure switch 194. As the liquid level control 196 senses the level in reservoir vessel 198 needs to be raised, it increases the pressure signal to three-way pressure switch 194 shifting the three-way switch to open port 202 and close port 200. When the level in reservoir vessel 198 rises to the high level set point, the output of liquid level control 196 decreases to where three-way pressure switch 194 reverses and port 202 closes and port 200 opens.

When port 202 of three-way pressure switch 194 is opened and port 200 is closed, any hydrocarbons being dumped from hydrocarbon chamber 111 of vacuum vessel 102 by liquid level control 192 are routed to hydrocarbon reservoir vessel 198 through pipe 204, pipe 206, control valve 208, and pipe 210. When port 200 of three-way pressure switch 194 is opened and port 202 is closed, any hydrocarbons being dumped from the hydrocarbon chamber 111 of vacuum vessel 102 by liquid level control 192 are routed to storage (not shown) through pipe 204, pipe 212, control valve 214, and pipe 216. By only transferring recovered liquid hydrocarbons to storage when reservoir vessel 198 is operationally full, the previously described system insures that there is always enough liquid hydrocarbons in reservoir vessel 198 to operate the hydrocarbon stripping system.

Reservoir vessel 198 is maintained at a pressure of between approximately 5 and 10 pounds lower than the pressure used to evacuate hydrocarbon chamber 111 of vacuum vessel 102. Back-pressure regulator 238, which is connected to reservoir vessel 198 by line 236, is set to relieve, through pipe 240, any pressure in reservoir vessel 198 that is in excess of the high pressure set point. The gases that are released from reservoir vessel 198 flow through pipe 236, back-pressure regulator 238 and pipe 130 to inlet 136 on still column 24. The vented gases flow into still column 24 where they mix with the effluents in still column 24. As previously described, the vented gases along with the other effluents are recovered in vacuum separator 102. Pressure regulator 230 is set approximately 5 pounds lower then the high pressure set point on back pressure regulator 238. When the pressure in reservoir vessel 198 drops approximately 5 pounds below the high pressure set point, pressure regulator 230 begins to open and either recovered gas from emissions separator 50 or gas from the supply gas system flows through pipe 234, pressure regulator 230, and pipe 232 into reservoir vessel 198. Preferably, the gas passing through pressure regulator 230 to maintain the low-pressure set point in reservoir 198 would, as shown, come from the recovered gas system.

The liquid hydrocarbons in reservoir vessel 198 are released into the hydrocarbon stripping system by control valve 218. Control valve 218 is operated by pressure-stat 220 such as supplied by Kimray, Inc. Pressure-stat 220 has an adjustable spring that opposes a pressure-loaded diaphragm. The diaphragm of pressure-stat 220 is connected through line 226 to pipe 224. As the pressure rises in pipe 224, the increased pressure on the diaphragm of pressure-stat 220 causes pressure-stat 220 to react to decrease the pressure on the diaphragm of control valve 218. Decreasing the pressure on the diaphragm of control valve 218 causes control valve 218 to partially or completely close, decreasing or stopping the flow of hydrocarbons through pipe 222 and control valve 218. As the pressure in pipe 224 decreases, the decreased pressure on the diaphragm of pressure-stat 220 causes pressure-stat 220 to react to increase the pressure on the diaphragm of control valve 218. Increasing the pressure on the diaphragm of control valve 218 causes control valve 218 to partially or completely open increasing the flow of hydrocarbons through pipe 222 and control valve 218.

From outlet 219 of control valve 218, the recovered, liquid hydrocarbons flow through pipe 223 to the inlet of either heat exchange coil 221 mounted in reboiler 68 or a heat exchange coil mounted in an indirect heater (not shown). To heat the recovered, liquid hydrocarbons on new dehydrators, it is preferable to use heat exchange coil 221 mounted in reboiler 68. To heat the recovered, liquid hydrocarbons on retrofitted dehydrators, it is preferable to use a heat exchange coil mounted in an indirect heater (not shown). For this embodiment, the operation of a new dehydrator with a heat exchange coil mounted in the reboiler is described. The recovered, liquid hydrocarbons flow through heat exchanger coil 221 which is immersed in the hot glycol contained in reboiler 68. While in heat exchange relationship with the hot glycol in reboiler 68, the recovered, liquid hydrocarbons gain heat causing the recovered, liquid hydrocarbons to vaporize and increase in pressure. The hot, vaporized, liquid hydrocarbons exit heat exchanger coil 221 and flow through pipe 224 to fixed choke 228. Fixed choke 228 is sized to pass the volume of vaporized, liquid hydrocarbons required to super dry hot glycol exiting stripping column 237 at point 235. Pressure-stat 220 controls the pressure in pipe 224 as well as allowing (within limits) the pressure in pipe 224 to be raised or lowered to either increase or decrease the volume of vaporized, liquid hydrocarbons flowing through fixed choke 228. Pressure-stat 220 must be set to maintain the maximum pressure in pipe 224 to at least 5 psig below minimum set pressure in hydrocarbon reservoir 198.

The hot, vaporized, liquid hydrocarbons exit fixed choke 228 and flow through pipe 233 to the gas inlet of stripping column 237. As described above, the hot, vaporized, liquid hydrocarbons flow upwardly through the packing in stripping column 237 coming in intimate contact with the hot glycol which is flowing downwardly out of reboiler 68 through the packing in stripping column 237. While in intimate contact with the hot glycol in stripping column 237, the hot, vaporized, liquid hydrocarbons cause additional water to be removed from hot, dry glycol exiting reboiler 68 and super dry glycol exits stripping column 237 at point 235 and flow into pipe 70.

To complete the closed loop stripping system, as previously described, the hot, vaporized, liquid hydrocarbons flow through stripping column 237, reboiler 68, still column 24, pipe 82, overhead condenser 84, and pipe 100 into the weir section of vacuum separator 102 where the condensed liquid hydrocarbons are transferred into hydrocarbon chamber 111. From hydrocarbon chamber 111, liquid hydrocarbons, enough to keep reservoir vessel 198 operationally full of liquid hydrocarbons, are transferred through pipe 204, pipe 206, control valve 208, and pipe 210 into reservoir 198. From reservoir 198, the liquid hydrocarbons flow through pipe 222, valve 218, heat exchange coil 221, pipe 224, fixed coke 228, and pipe 233 into the hot, vaporized, liquid hydrocarbon inlet of stripping column 237.

In some applications, where it is anticipated that high temperature gas (110 to 140 degrees Fahrenheit) will be encountered, it may be desirable to eliminate the hot glycol flow exiting the absorber from the glycol flow to the glycol cooler. Eliminating hot glycol from the absorber flowing through the glycol cooler significantly decreases the cooling load on the glycol cooler.

Figure 8:
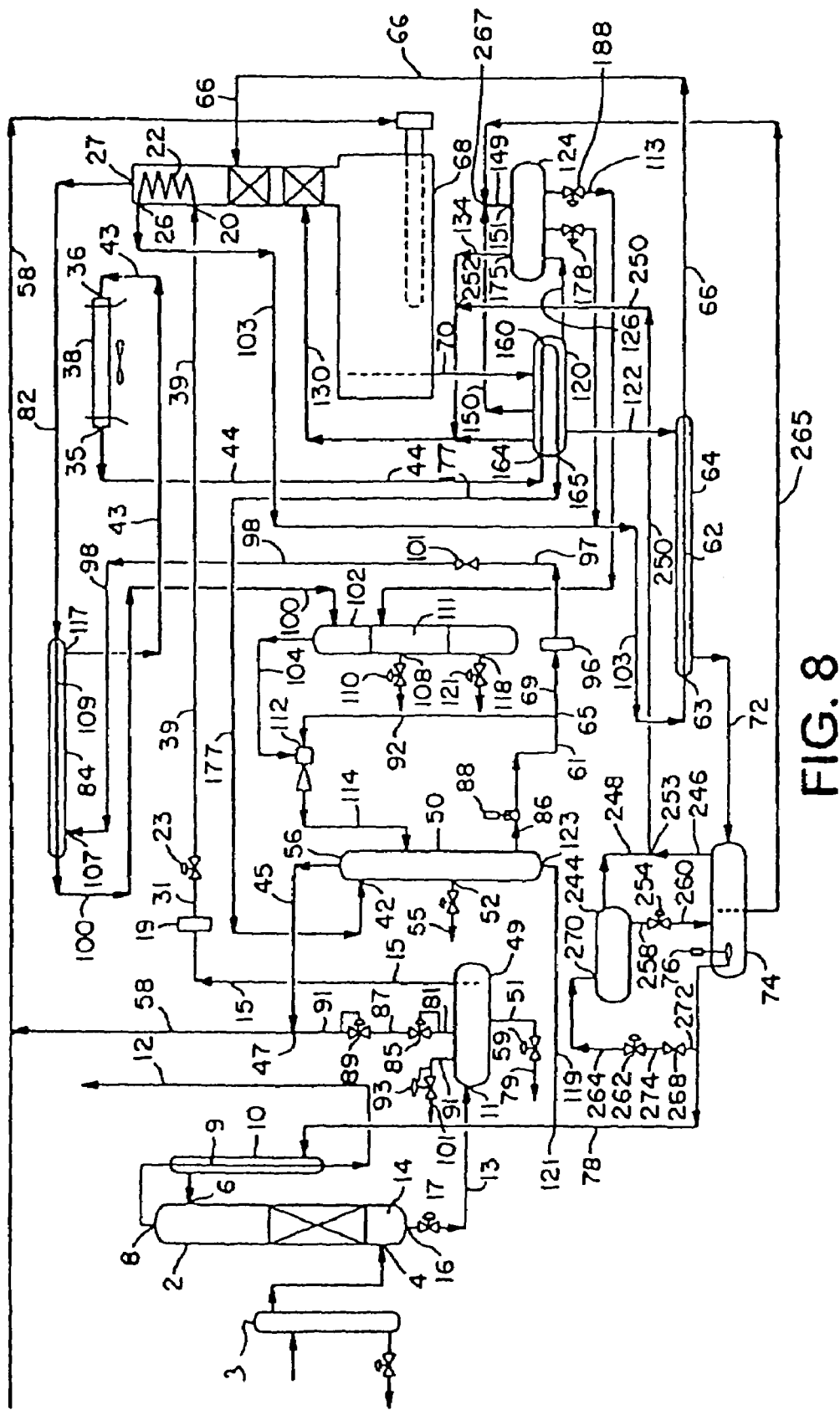
FIG. 8 is a flow diagram of another embodiment of this invention.

FIG. 8 discloses another embodiment of the invention which eliminates the hot glycol flow from the absorber combining with the glycol flow to the glycol cooler. FIG. 8 incorporates a large part of FIG. 3 and FIG. 6 wherein the same reference numerals have been applied to corresponding parts of FIG. 3 and FIG. 6. Either of the processes to obtain super dry glycol as shown by FIG. 3 or FIG. 6 are applicable for use with the embodiment shown in FIG. 8. To simplify the description of the embodiment shown by FIG. 8, the process to obtain super dry glycol, as shown in FIG. 3, has been selected for the description of the embodiment shown by FIG. 8.

As illustrated in FIG. 8, wet glycol is collected in wet glycol sump 14 in the bottom portion of absorber 2 and contains entrained and absorbed gases, liquid hydrocarbons, and water and exits absorber 2 at point 16. The flow of the wet glycol is controlled by a throttling liquid level control (not shown) located in absorber 2 which operates control valve 17 to maintain a constant level of wet glycol in the bottom of absorber 2. The wet glycol is discharged by control valve 17 and flows through pipe 13 to inlet 11 of three-phased flash separator 49.

Free gaseous hydrocarbons contained in the wet glycol are released in three-phased flash separator 49 as a result of the reduction of pressure from the pressure of the absorber of between approximately 50 and 1500 PSIG to the pressure in the three-phased flash separator which is generally between approximately 75 and 125 PSIG. Liquid hydrocarbons are separated from the wet glycol in three-phased flash separator 49 by a weir system or interface liquid level control (not shown) and are withdrawn through pipe 51, control valve 59 and pipe 79 to storage (not shown) or other apparatus. Control valve 59 is operated by a liquid level control (not shown) mounted in three-phase flash separator 49.

The freed gaseous hydrocarbons exit three-phased flash separator 49 and flow through pipe 81, back-pressure regulator 85, pipe 87, pressure regulator 89, and pipe 91 to point 47 where the freed gaseous hydrocarbons combine with gaseous hydrocarbons from emissions separator 50 which are flowing to point 47 through pipe 45. The operation of emissions separator 50 is explained below. From point 47, the combined gaseous hydrocarbons flow through pipe 58 into a system such as that described in U.S. Pat. No. 5,766,313, to be used as a fuel in a reboiler as described therein.

Backpressure regulator 85 maintains the minimum set pressure on three-phased flash separator 49. Pressure regulator 89 controls the maximum set pressure on emissions separator 50. Backpressure regulator 93 controls the maximum set pressure on three-phased flash separator 49. In the event the pressure in three-phased flash separator 49 builds to a point high enough to actuate back pressure-regulator 93, the excess pressure is relieved through pipe 91, back-pressure regulator 93 and pipe 101.

Wet glycol exits three-phased flash separator 49 and flows through pipe 15, particulate filter 19, pipe 31, control valve 23 and pipe 39 to inlet 20 of reflux coil 22. Control valve 23 is preferably operated by an interfacing liquid level control (not shown) mounted in three-phased flash separator 49. Wet glycol flows through reflux coil 22 cooling and condensing some of the hot vapors in the top of still column 24. The wet glycol at inlet 20 is between approximately 110 to 130 degrees Fahrenheit and at the exits approximately 160 degrees Fahrenheit. The wet glycol exits reflux coil 22 at exit 26 and flows through pipe 103 to inlet 63 of tube side 62 of glycol heat exchanger 64. It is understood that any type of heat exchanger may be used in place of glycol-to-glycol heat exchanger 64. The wet glycol flowing through tube side 62 of glycol-to-glycol heat exchanger 64 is heated by the hot glycol therein and flows from glycol-to-glycol heat exchanger 64 through pipe 66 and enters still column 24 of conventional reboiler 68, such as that illustrated in the '313 Patent wherein wet glycol is changed into hot, dry glycol which is then fed through pipe 70 into water exhauster 120. Water exhauster 120 and blowcase 124 operate as previously described so that hot, super dry glycol exits from water exhauster 120 through pipe 122, enters the shell side of heat exchanger 64 and is cooled by the cool glycol flowing through tube side 62 of glycol-to-glycol heat exchanger 64. The partially cooled super dry glycol then passes through pipe 72 into a super dry glycol storage 74 from which it is pumped by pump 76 through pipe 78 into the gas to glycol exchanger 10 to be further cooled by natural gas flowing through heat exchanger 10 and into pipe 12. The cooled super dry glycol exits gas to glycol heat exchanger 10 through pipe 6 and enters absorber 2 where it comes into contact with wet natural gas flowing through absorber 2. After the super dry glycol has been contacted by wet natural gas, it collects as wet glycol in sump 14 of absorber 2 and the closed glycol loop has been completed.

A second loop system is shown by FIG. 8. The second loop system incorporates all the components required to recover the effluents which exit the still column of a dehydrator. The major components in the second loop system are emissions separator 50, vacuum separator 102, glycol cooler 38, and overhead condenser 84.

At start up of the second loop system, all major components and associated equipment and piping composing the second closed loop system, which require a glycol flow, are charged with glycol, and, at the same time, a level of glycol is established in emissions separator 50. The glycol level in emissions separator 50 remains relatively constant. Pipe 119 facilitates making the original charge of glycol in the second closed loop glycol system. Pipe 119 is connected at point 121 to discharge pipe 78 from glycol pump 76 and at point 123 to emissions separator 50. If introducing glycol into the second loop glycol system is desired, glycol may be introduced by opening a manual valve (not shown) so that glycol can be pumped by pump 76 through pipe 78 and pipe 119 into emissions separator 50.

The glycol charge in the second loop is continuously circulated from emissions separator 50 by circulating pump 88. The glycol, at a pressure of approximately 100 PSIG higher than the pressure in emissions separator 50, flows through line 61 to point 65. At point 65 the glycol stream splits. The first glycol stream flows through pipe 92 and provides energy to power eductor 112 (described below). The second glycol stream flows from point 65 through pipe 69, particulate filter 96, pipe 97, fixed choke or other control 101, and pipe 98 to inlet 107 of the shell side of overhead condenser 84. Fixed choke or other control 101 controls the volume of glycol that is flowing through pipe 98 into overhead condenser 84. The second stream of glycol flows through the shell side of overhead condenser 84 and cools hot effluent from still column 24. The second stream of glycol exits overhead condenser 84 at exit 117 and flows through pipe 43 to inlet 36 of glycol cooler 38. The design and function of glycol cooler 38 has been previously described. The cooled second stream of glycol exits glycol cooler 38 at point 35 and flows through pipe 44 to inlet 164 of condenser tube bundle 160 mounted in water exhauster 120. Condenser tube bundle 160 functions as previously described to cool hot vapors in the vapor section of water exhauster 120. The second stream of glycol exits condenser tube bundle 160 and flows through pipe 177 where it enters emissions separator 50 at point 42.

As previously described, heat applied to the wet glycol in reboiler 68 releases effluents that exit from still column 24 at point 27. From point 27, the effluents flow through pipe 82, overhead condenser 84, and pipe 100 into vacuum separator 102. The function of vacuum separator 102 and eductor 112 has been previously described. Emissions separator 50 has the same function as previously described, but since no processed glycol is being received or discharged by emissions separator 50, no automatic control of the glycol level in emissions separator 50 is required nor is there any need for emissions separator 50 to be three-phased.

The glycol storage on most glycol dehydrators operates at atmospheric pressure. A pipe 75, as shown in FIG. 2, is generally used to vent to the atmosphere the glycol storage of a dehydrator. Pipe 75 is opened to the atmosphere and is connected to glycol storage 74 at point 77.

Two problems are created when the glycol storage of a dehydrator is vented to the atmosphere. The first problem is that any excess glycol (more than the capacity of the storage to handle) that flows into the storage as a result of overfilling of the dehydrator, upset of the process, or malfunction of the equipment will flow out of the glycol storage through a vent line such as pipe 75. Depending upon how the installation of the dehydrator is designed to handle glycol storage overfill conditions, any glycol which overfills the storage and flows out a vent pipe such as pipe 75 could contaminate the environment. As a minimum, unless special accommodations have been made, any glycol, which flows out pipe 75, will be wasted. The second problem that occurs when the glycol storage of a dehydrator is vented to the atmosphere is that the hot glycol in the storage is allowed to contact oxygen in the air. Oxygen in contact with hot glycol will cause degradation of the glycol.

FIG. 9 shows another embodiment of the invention. FIG. 9 incorporates a large portion of FIG. 3 wherein the same reference numerals have been applied to corresponding parts of FIG. 3. In FIG. 3 there is illustrated an embodiment of the invention wherein the glycol storage operates under a vacuum to eliminate the problems of the glycol storage being vented to the atmosphere.

As illustrated in FIG. 3, glycol storage 74 is connected to point 136 of still column 24 by vent pipe 246, vent pipe 250, vent pipe 134, and vent pipe 130. Still column 24 operates under a vacuum. Glycol storage 74 is also connected to glycol reservoir 244 by vent pipe 248. Glycol storage 74 is also connected to glycol reservoir 244 by glycol fill pipe 258, control valve 254 and pipe 260. Glycol reservoir 244 is connected to high-pressure discharge pipe 78 by pipe 272, fixed choke 268, pipe 266, control valve 262, and pipe 264. Operating glycol storage 74 in a closed loop glycol system under a vacuum eliminates the problems of hot glycol coming into contact with air and of glycol being wasted or contaminating the environment.

As shown in FIG. 9, glycol storage 74 provides the glycol to the suction of glycol pump 76 (glycol pump 76 may be a stand alone pump or it may be a pump that is internally mounted in the glycol storage). It is necessary at all times to maintain, in glycol storage 74, a glycol level adequate to provide the suction head to pump 76. To maintain the glycol level in glycol storage 74, a reverse acting, interface liquid level control 255 is utilized. Liquid level control 255 puts out a pressure signal that increases as the glycol level in glycol storage 74 lowers and decreases as the glycol level in glycol storage 74 rises. The pressure signal from liquid level control 255 is connected to a control valve 254 and to a reverse acting pressure switch 256 such as a Kimray 3 PGRA Throttle-Reverse Pilot. Pipe 258 connects control valve 254 to reservoir vessel 244. Pipe 260 connects control valve 254 to glycol storage vessel 74. The lower opening diaphragm pressure (15 PSIG) of control valve 255 is adjusted by turning jackscrew 257 to compress the diaphragm spring. As the glycol level in glycol storage vessel 74 lowers, the output pressure of liquid level control 255 increases. When the output pressure of liquid level control 255 reaches 15 PSIG, control valve 254 begins to open and control valve 254 will remain open until the output pressure of liquid level control 254 drops below 15 PSIG. While control valve 254 is open, glycol in reservoir vessel 244 flows through pipe 258, control valve 254, and pipe 260 into glycol storage 74 maintaining the lower level of glycol in storage vessel 74.

As previously described, the output from liquid interface level control 255 is connected to pressure switch 256 as well as control valve 254. The lower operating pressure of pressure switch 256 is set at 5 PSIG by adjustment of jackscrew 259. When a condition exists where more glycol from glycol-to-glycol heat exchanger 64 enters through pipe 72 into glycol storage 74 than pump 76 is pumping to absorber 2, the glycol level in glycol storage 74 will rise. As the glycol level in glycol storage 74 rises, the output pressure of liquid level control 255 decreases. When the output pressure of liquid level control 255 drops to 5 PSIG, pressure switch 256 outputs a throttling pressure signal to control valve 262 beginning the opening of control valve 262.

The downstream side of control valve 262 is connected by pipe 264 to reservoir vessel 244 at point 270. The upstream side of valve 262 is connected by pipe 266, fixed choke 268, and pipe 272 to pump 76 high pressure (50 to 1500 PSIG) discharge pipe 78 which supplies the lean glycol to absorber 2. When control valve 262 is open, fixed choke 268 controls the volume of glycol flowing to reservoir vessel 244. Fixed choke 268 is preferably sized to allow no more the 25% of the output volume of pump 76 to flow from pipe 78 through valve 262 into reservoir vessel 244. As a result of allowing some of the glycol being pumped by pump 76 to be transferred to reservoir vessel 244 instead of entering absorber 2, the glycol overfill level in glycol storage 74 lowers. Lowering the glycol level in glycol storage 74 causes the output pressure from liquid level control 255 to increase. When the output pressure from liquid level control 255 again reaches 5 PSIG, pressure switch 256 bleeds off the pressure signal to control valve 262 and control valve 262 closes, stopping the flow of glycol from pipe 78 into reservoir vessel 244.

Normal operation of glycol storage 74 is when the output of liquid level control 255 is between 5 and 15 PSIG. Opening and closing control valves 254 and 262 maintains the level in glycol storage 74 at the normal condition where adequate glycol is supplied to pump 76 and no hot glycol contacts air, contaminates the environment, or is wasted. By using interfacing liquid level control 255, liquid hydrocarbons that might enter glycol storage vessel 74, through contamination of the process glycol, will not materially change the glycol level in glycol storage 74. Liquid hydrocarbons, which might enter glycol storage 74, would separate and float on top of the glycol. Over time, the liquid hydrocarbons can build to a high level on top of the glycol in glycol storage 74, and any additional liquid hydrocarbons will need to be removed. As shown in FIG. 3, the outlet of pipe 261 is located close to the top of glycol storage 74 and exits glycol storage 74 at point 263. The purpose of pipe 261 is to set the upper level of any liquid hydrocarbons that might collect on top of the glycol in glycol storage 74. Liquid hydrocarbons that exit glycol storage 74 through outlet 263 flow through pipe 265 to point 267 where the liquid hydrocarbons combine with the liquid hydrocarbons from water exhauster 120. The combined stream of liquid hydrocarbons flows through pipe 149 to enter at point 151 into blowcase 124. As previously described, the weir system of blowcase 124 transfers the liquid hydrocarbons into oil chamber 184. From oil chamber 184 the liquid hydrocarbons are transferred to either the hydrocarbon chamber 111 of vacuum separator 102 or to storage (not shown).

There are applications where the amount of gas, recovered by the previously described invention, can be more than the amount of gas required to fire the reboiler. One example, of an application where the amount of gas recovered by the invention might be more than is required by the reboiler to heat the dehydration process, is at compressor stations where widely varying flow rates and temperatures of the gas being processed by the absorber can create conditions where excess gas can be recovered. A second example, of an application where the amount of gas recovered by the invention might be more than is required by the reboiler to heat the dehydration process, is where the composition of the gas being processed by absorber 2 creates unusually high BTU values for the recovered gas.

In applications where the amount of gas recovered by the invention is more than is required by the reboiler to heat the dehydration process, the excess recovered gas can be used for other purposes. Some of the other possible uses of the excess recovered gas are in a plants fuel system or the firing of other production equipment on the gas well or plant location.

Figure 10:
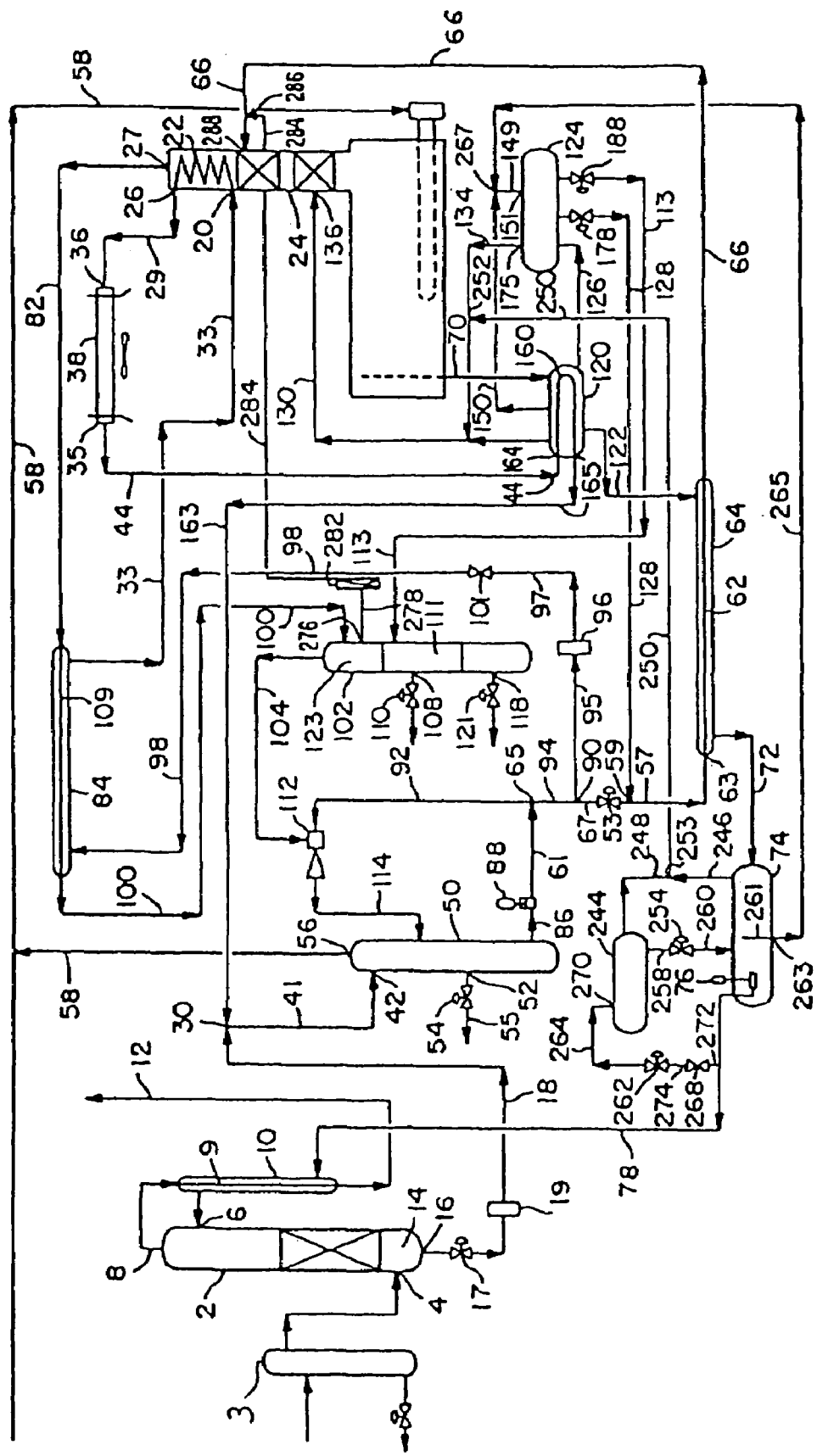
FIG. 10 is a flow diagram of another embodiment of this invention.

In applications where there is no other use for excess gas recovered by the invention, the excess gas can be consumed by increasing the heat load on the reboiler. FIG. 10 discloses another embodiment of the invention. FIG. 10 incorporates a large portion of FIG. 3 wherein the same reference numerals have been applied to corresponding parts of FIG. 3. In FIG. 10, there is illustrated an embodiment of the invention whereby additional heat load, more then the heat load required by the dehydration process, can be applied to the reboiler.

To illustrate the present invention, the dehydration process utilizing the invention's gas recovery system and water exhauster system for obtaining super dry glycol has been chosen. Any of the other dehydration gas recovery processes previously described can be used to illustrate the present invention.

Referring to FIG. 10, the components necessary to inject water into still column 24 are added to the flow diagram illustrated by FIG. 3. Pipe 278 is connected to outlet 276 located close to the bottom of the recovered water section created by the weir system in chamber 123 of vacuum separator 102. Water flows from outlet 276 through pipe 278 to the suction inlet of metering pump 282. Metering pump 282 may be electrically or pneumatically powered and is designed to allow the output volume to be varied over a wide range. From the discharge of metering pump 282, recovered water is pumped through pipe 284 to point 286. At point 286 the water pumped by metering pump 282 mixes with hot wet glycol flowing in pipe 66 from glycol-to-glycol heat exchanger 64. The mixture of water and hot wet glycol enters still column 24 at point 288. Considering the firing efficiency of the fire tube in reboiler 68, each pound of water injected into still column 24 causes approximately 2000 BTU of excess gas to be consumed by reboiler 68. In applications where injecting the water into still column 24 is not practical, the water can be injected directly into reboiler 68.

The injected water at point 288 converts to steam and mixes with other effluents in still column 24. As previously described, the effluents exit still column 24 at point 27 and flow through pipe 82, overhead condenser 84, and pipe 100 into the weir section of vacuum separator 102.

The injected water flows in a closed loop system from vacuum separator 102 to still column 24 and overhead condenser 84, then back to vacuum separator 102. While flowing through the closed loop system, the injected water changes phase twice. The water exits vacuum separator 102 as a liquid, reboiler 68 adds heat which converts the liquid to steam, and overhead condenser 84 condenses the steam back to a liquid before the water returns to vacuum separator 102.

The approximately 1200 BTU per pound of water that is removed from reboiler 68 by converting the injected water to steam increases the heat load on overhead condenser 84 by an equal amount. By heat exchange with the glycol flowing in the shell side of overhead condenser 84, heat from the steam is transferred to the flowing glycol. The flowing glycol exits overhead condenser 84 and flows through pipe 33, reflux coil 22, and pipe 29 to glycol cooler 38 where heat is removed from the flowing glycol by exhausting the heat into the atmosphere.

The preceding examples can be repeated with similar success by substituting the generically or specifically described components and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for dehydrating natural gas, said apparatus comprising:
    an absorber for receiving natural gas;
    at least one circulating apparatus linked to said absorber for circulating a wet desiccant and a dry desiccant;
    at least one emissions separator linked to said at least one circulating apparatus through which gaseous hydrocarbons exit;
    a water exhauster comprising a weir system, said water exhauster linked to a heat source; and wherein gaseous hydrocarbons are not released to the atmosphere.

2. The apparatus of claim 1 further comprising:

a still column linked to said absorber;

at least one liquid removal separator linked to said still column; and at least one vacuum system linked to said at least one separator.

3. The apparatus of claim 1 wherein said heat source is linked to said absorber and wherein; and a glycol-to-glycol heat exchanger is linked to, and between, said heat source and said absorber.

4. The apparatus of claim 1 further comprising a glycol cooler linked to said at least one emissions separator.

5. The apparatus of claim 1 further comprising a blowcase linked to said water exhauster.

6. The apparatus of claim 1 further comprising a glycol storage linked to said absorber and a glycol reservoir linked to a glycol storage.

7. The apparatus of claim 5 further comprising a gas recovery system to receive gas from said blowcase.

8. The apparatus of claim 7 wherein said gas recovery system comprises a heat source firing system.

9. The apparatus of claim 5 wherein hydrocarbons are released from said blowcase and sent to said liquid separator.

10. The apparatus of claim 9 further comprising conduits to send said hydrocarbons released from said blowcase to storage facilities.

11. The apparatus of claim 9 further comprising conduits to transfer said gas hydrocarbons to a gas recovery system.

12. The apparatus of claim 1 wherein said heat source is disposed within said water exhauster to enhance vaporization and circulation of liquids.

* * * * *